United States Patent [19]
Shrader

[11] Patent Number: 5,864,666
[45] Date of Patent: Jan. 26, 1999

[54] WEB-BASED ADMINISTRATION OF IP TUNNELING ON INTERNET FIREWALLS

[75] Inventor: Theodore Jack London Shrader, Cedar Park, Tex.

[73] Assignee: International Business Machines Corporation, Armonk, N.Y.

[21] Appl. No.: 773,542

[22] Filed: Dec. 23, 1996

[51] Int. Cl.[6] ............................. G06F 11/00; G06F 11/32
[52] U.S. Cl. ................................. 395/187.01; 395/200.59; 380/25
[58] Field of Search ...................... 395/187.01, 188.01, 395/186, 200.59, 183.22; 380/23, 25

[56] References Cited

U.S. PATENT DOCUMENTS

| | | | |
|---|---|---|---|
| 4,932,054 | 6/1990 | Chou et al. | 380/4 |
| 5,063,523 | 11/1991 | Vrenjak | 395/200.54 |
| 5,063,535 | 11/1991 | Jacobs et al. | 395/183.22 |
| 5,416,842 | 5/1995 | Aziz | 380/30 |
| 5,548,646 | 8/1996 | Aziz et al. | 380/23 |
| 5,550,984 | 8/1996 | Gelb | 395/200.17 |
| 5,606,668 | 2/1997 | Shwed | 395/200.11 |
| 5,623,601 | 4/1997 | Vu | 395/187.01 |
| 5,632,011 | 5/1997 | Landfield et al. | 395/326 |
| 5,673,322 | 9/1997 | Pepe et al. | 380/49 |

OTHER PUBLICATIONS

Bellovin et al., "Network Firewalls", IEEE, pp. 50–57, Sep. 1994.
Gassman, "Internet Security and Firewalls Protection on the Internet", IEEE, pp. 93–107, Jul. 1996.

*Primary Examiner*—Robert W. Beausoliel, Jr.
*Assistant Examiner*—Scott T. Baderman
*Attorney, Agent, or Firm*—Jeffrey S. LaBaw

[57] ABSTRACT

Administering tunneling on a firewall computer between a secure computer network and a nonsecure computer network in a web based interface is disclosed. Tunnels are displayed in graphical depictions as lines connecting icons representing network addresses. User selection of a line, will bring up a selected tunnel definition represented by the first line is displayed in another pane in the interface or a list of filter rules applicable to the tunnel. At this point, an action on the selected tunnel definition may be performed responsive to user input. Queries can be run on a tunnel definition to determine whether any existing tunnel definitions match the entered tunnel definition, or whether there are any filter rules in effect for a given tunnel definition. The results of the query are displayed in a scatter bar in another pane in the user interface, wherein locations of matches are indicated by lines through the scatter bar. A small bar is displayed proximate to the scatter bar, the small bar indicating the position of the displayed list relative to a complete list represented by the scatter bar.

30 Claims, 23 Drawing Sheets

WEB-BASED ADMINISTRATION OF IP TUNNELING ON INTERNET FIREWALLS

BACKGROUND OF THE INVENTION

This application is related to copending, commonly assigned application entitled "Web-Based Administration of IP Filtering on Internet Firewalls" by T. Shrader, Serial No. 08/773,543, filed Dec. 23, 1996, which is hereby incorporated by reference.

This application relates generally to security systems in a distributed computer network. More particularly, it relates to a web-based interface for administering IP tunneling on a firewall computer such as that would be found between the non-secure Internet and a secure company Intranet.

The burdens on Internet administrators have been rapidly growing both in volume and in complexity. Chief among them is the need for corporate administrators to administer Internet firewalls which connect a company's or organization's secure Intranet to the outside unsecure Internet. Generally in the prior art, the interface for firewall is a command line or SMIT interface which allows the administrator to manage Internet firewall characteristics and operations. These types of interfaces require a the memorization of many commands. Further, administrators are required to piece together output from different actions to administrate the tunnel rules which govern the firewall. This is an obvious inconvenience as administrators must remember or write down information from a plurality of screens. In short, the interface is anything but user friendly.

The present invention described below provides a user friendly interface for the administration of IP tunneling on an Internet firewall.

SUMMARY OF THE INVENTION

Therefore, it is an object of the invention to improve the interface for administering IP tunneling on a firewall computer.

This and other objects are accomplished by administering tunneling on a firewall computer between a secure computer network and a nonsecure computer network.

In one preferred embodiment, a graphical depiction of tunnels between addresses in the networks is presented as lines connecting icons representing network addresses. Responsive to user selection of a first line, a selected tunnel definition represented by the first line is displayed in another pane in the interface. At this point, an action on the selected tunnel definition may be performed responsive to user input. The graphical depiction of the tunnels can be selectively altered to show all the defined tunnels, show the active tunnels or show the inactive tunnels according to user input.

In another embodiment of the invention, a user interface is presented having a first pane in which a tunnel definition can be entered. A query is run on an entered tunnel definition to determine whether any existing tunnel definitions match the entered tunnel definition. The results of the query are displayed in a scatter bar in another pane in the user interface, wherein locations of matching tunnel definitions are indicated by lines through the scatter bar. A small bar is displayed proximate to the scatter bar, the small bar indicating the position of the displayed list of tunnel definitions relative to a complete list of tunnel definitions represented by the scatter bar. At this point, an action may be performed on a selected tunnel definition.

In yet another embodiment of the invention, a graphical depiction of tunnels between addresses in the networks is presented as lines connecting icons representing network addresses. Responsive to user selection of a first line, a list of filter rules applicable to a selected tunnel represented by the first line is displayed. A scatter bar is displayed in another pane in the user interface, wherein locations of matching filter rules, within an overall filter rule list represented by the scatter bar, are indicated by lines through the scatter bar. At this point, responsive to user input, an action may be performed on a selected filter rule.

BRIEF DESCRIPTION OF THE DRAWINGS

The invention, features and advantages will be more readily understood with reference to the attached figures and following description.

DETAILED DESCRIPTION OF THE DRAWINGS

The invention may be run on a variety of computers or collection of computers under a number of different operating systems. The computer could be, for example, a personal computer, a mini computer, mainframe computer or a computer running in a distributed network of other computers. Although the specific choice of computer is limited only by processor speed and disk storage requirements, computers in the IBM PC series of computers could be used in the present invention. One operating system which an IBM personal computer may run is IBM's OS/2 Warp 4.0. In the alternative, the computer system might be in the IBM RISC System/6000 (TM) line of computers which run on the AIX (TM) operating system.

Figure 1:
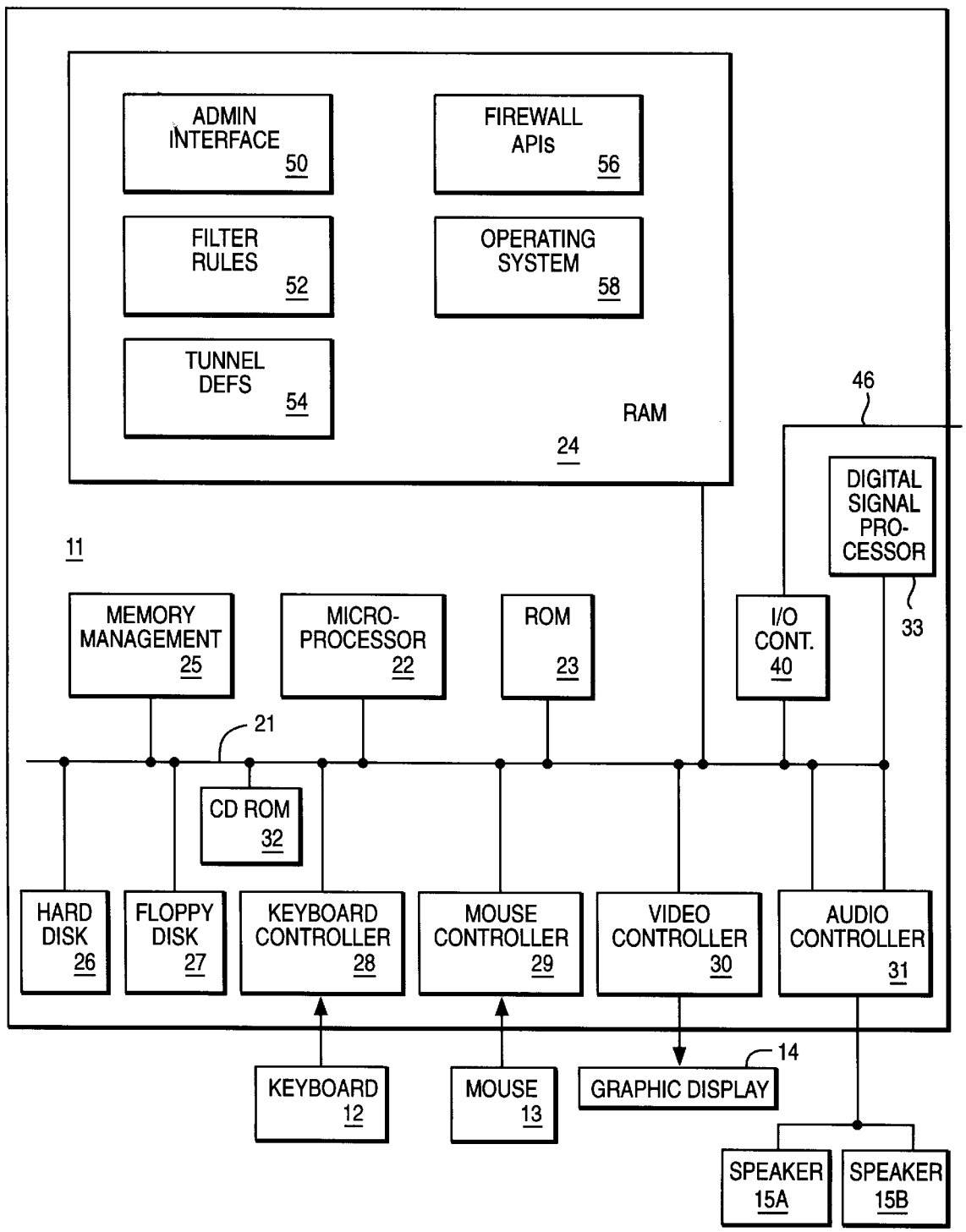
FIG. 1 depicts a computer system configured according to the teachings of the present invention.

In FIG. 1, a computer, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PC series of computers is one of the Intel family of microprocessors including the 386, 486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM. Other RISC chips made by Hewlett Packard, Sun, Motorola and others may be used in the specific computer.

The ROM 23 contains among other code the Basic Input-Output system (BIOS) which controls basic hardware operations such as the interaction and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. An I/O controller 40 such as a Token Ring Adapter enables communication over a network 46 to other similarly configured data processing systems.

One of the preferred implementations of the invention is as sets of instructions 50–58 resident in the random access memory 24 of one or more computer systems configured generally as described above. Until required by the computer system, the set of instructions may be stored in another computer readable memory, for example, in the hard disk drive 26, or in a removable memory such as an optical disk for eventual use in the CD-ROM 32 or in a floppy disk for eventual use in the floppy disk drive 27. Further, the set of instructions can be stored in the memory of another computer and transmitted over a local area network or a wide area network such as the Internet when desired by the user. One skilled in the art would appreciate that the physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements.

Further, the invention is often described in terms of comparing or validating, or other terms that could be associated with a human operator. No action by a human operator is desirable in any of the operations described herein which form part of the present invention; the operations are machine operations processing electrical signals to generate other electrical signals.

An Internet firewall product, such as IBM's Secure Way Firewall (SWF), allows administrators to create a physical firewall between an internal, secure network and the external, unsecure network of the internet. Besides the physical connections on the firewall machine, the firewall product provides a number of functions to help administrators control the flow of information out of and into the secure network. These functions include telnet and ftp proxy servers, SOCKS servers, specialized domain name services, IP tunneling across the internet between secure networks, and the implementation of filter rules to decide which IP packets should be permitted or denied into or out of the secure network.

One such filter rule could protect against IP spoofing, where an attacker changes an IP packet to make it appear that it came from a source IP address that is not the same as the attacker's workstation. The administrator could set up an IP filter rule that rejects IP packets that have a source IP address that is internal to the secure network but is coming from the unsecure network.

Figure 2:
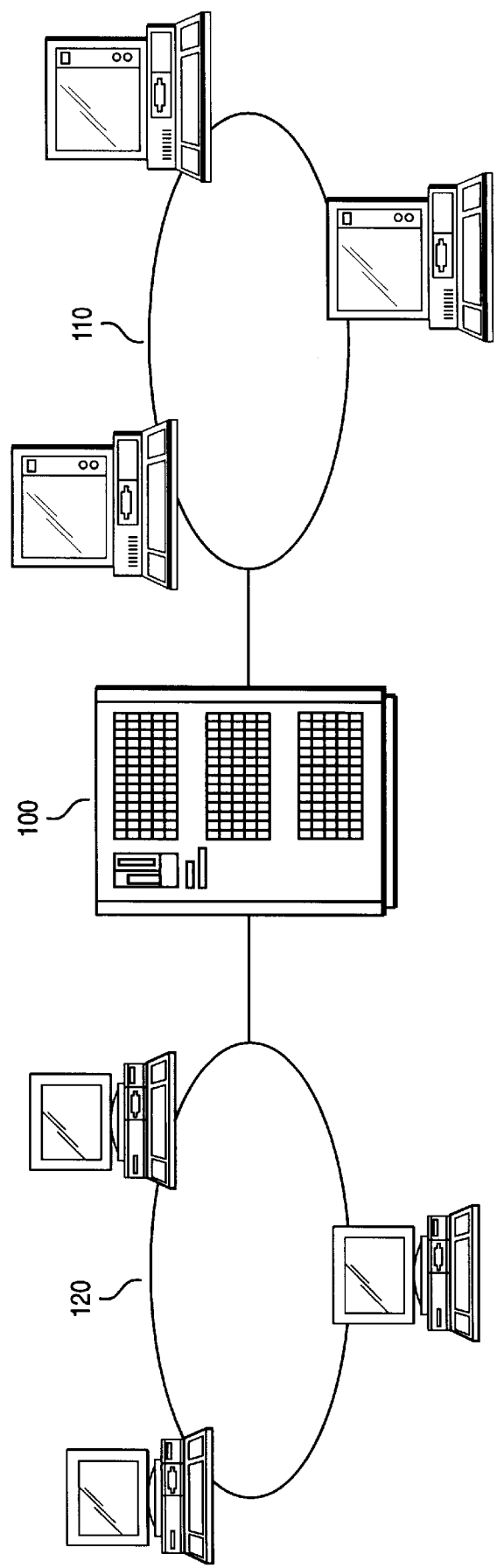
FIG. 2 shows one embodiment of a firewall environment in which the invention might be used.

FIG. 2 depicts a sample firewall configuration that utilizes a dual-homed host configuration. Here, only one machine 100, the bastion, is involved in the firewall and all IP packets are sent from the unsecure network 110 to the secure network 120 or vice versa through this machine. The firewall machine 100 has a screening filter, or IP filter, installed as well as firewall replacements for application gateways that are enabled or disabled on the firewall.

Figure 3:
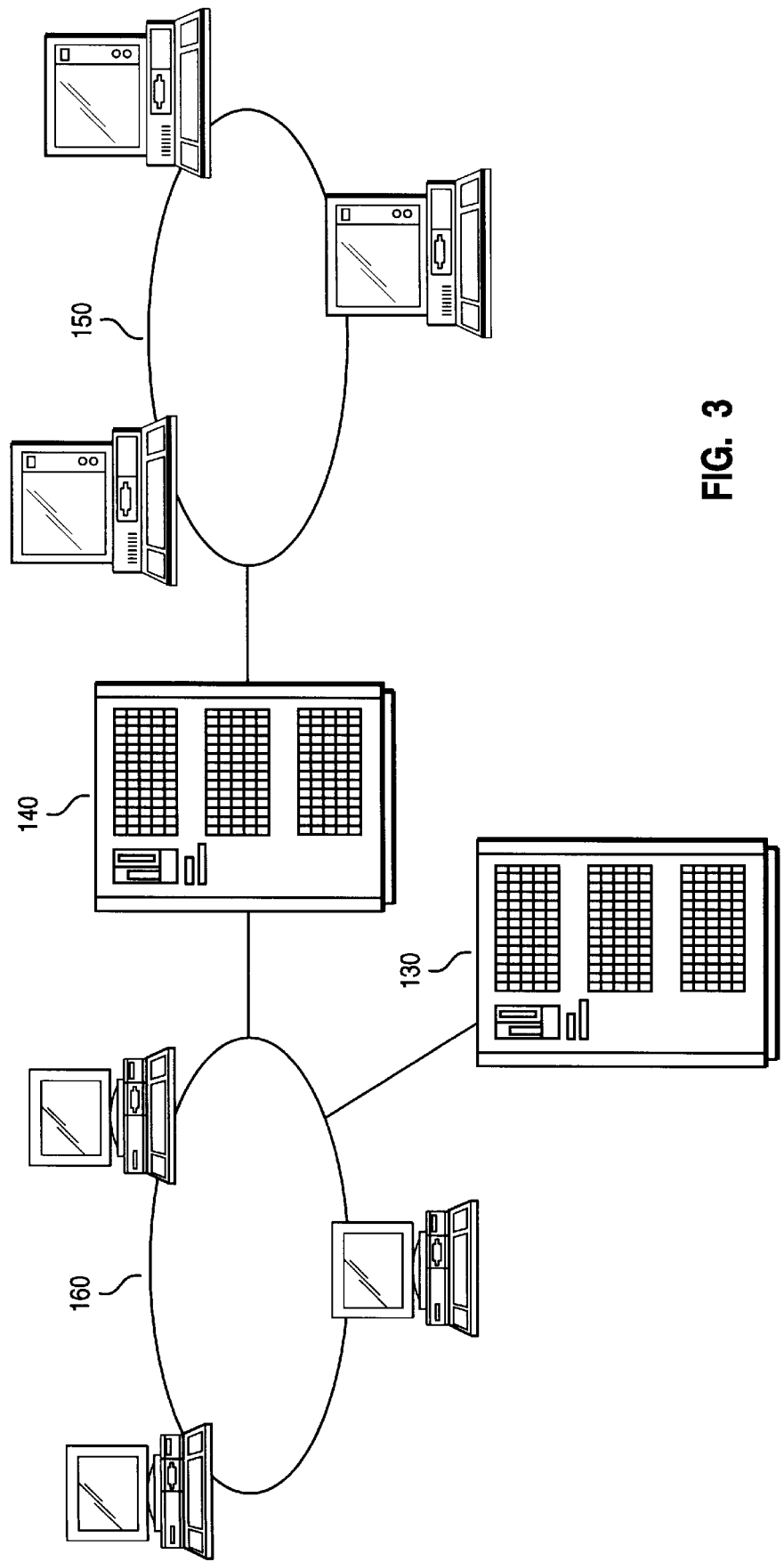
FIG. 3 illustrates another firewall environment in which the invention might be used.

FIG. 3 depicts an alternate configuration which places the bastion machine 130 behind another firewall machine 140 that contains the screening filter. This configuration provides more protection to the firewall since IP packets must first be permitted through the firewall before they can be processed by the application gateways on the bastion machine. The unsecure and secure networks are depicted in 150 and 160 respectively.

IP tunneling is the feature provided by internet firewalls which is the primary subject of the present invention. The administrator can define a tunnel between two internet firewalls that IP packets should flow through. The tunnel can impose authentication between the source and destination addresses as well as encrypt the IP packets flowing across the internet between the firewalls, depending on how the administrator defines the IP tunnel.

A full description of IP Tunnels is provided by the Internet Engineer's Task Force (IETF) specifications on Virtual Private Networks (VPN).

The processes by which the firewall accomplishes IP tunneling and filtering are not discussed in any detail below as they are known to the art. Further, they will vary according to a particular firewall technology as well as hardware dependencies. The web based interface discussed below will merely call the firewall through APIs or other software interfaces to perform the required functions in response to user input. Where this is not practical, the function of the firewall is replicated at the web pages which comprise the interface.

In contrast to the interfaces in the prior art, which generally must reside at the firewall computer itself, the web based interface of the present invention may reside at any computer in the network provided that proper security can be provided between the administrator's system and the firewall system. While the interface may be at the firewall or another system within the secure network, it is also possible that the administration of the firewall could occur outside the secure network at a particular trusted address. However, this is less preferred for reasons of security. Nonetheless, the interface is portable and allows the administrator a degree of flexibility not allowed by the prior art.

As discussed above, prior art interfaces are typically command line based in which the administrator is forced to learn a large number of arcane commands. The present invention uses a web based user interface framework. The administrator tasks for IP tunnels are divided into the definition of IP tunnels, the graphical display of IP tunnels, the querying of IP tunnels, and the querying of IP filter rules with IP tunnel definitions. In one preferred embodiment, the user interface is divided into the following web pages:

IP Tunnel Definition Page
IP Tunnel Graph Page
IP Tunnel Query Page
IP Tunnel/Filter Query Page These pages are described in greater detail below.

The invention is modular in design as the administrator need not install or use all the feature sets of the web-based administration browser. If the administrator is only interested in the management of filter rules, the paths leading to the other administration features, such as those for the SOCKS server and IP tunneling, need not be referenced. The other features can be plugged in when needed.

The invention adds many features for IP tunneling to the web-based firewall framework which are not available in prior art interfaces, while keeping the layout of its lower level pages consistent. Each page under the module level is divided into panes (or frames), and each pane will display a particular type of information no matter the page. Thus, the administrator can predict the context of the information depending where the information is presented on the page.

Figure 4:
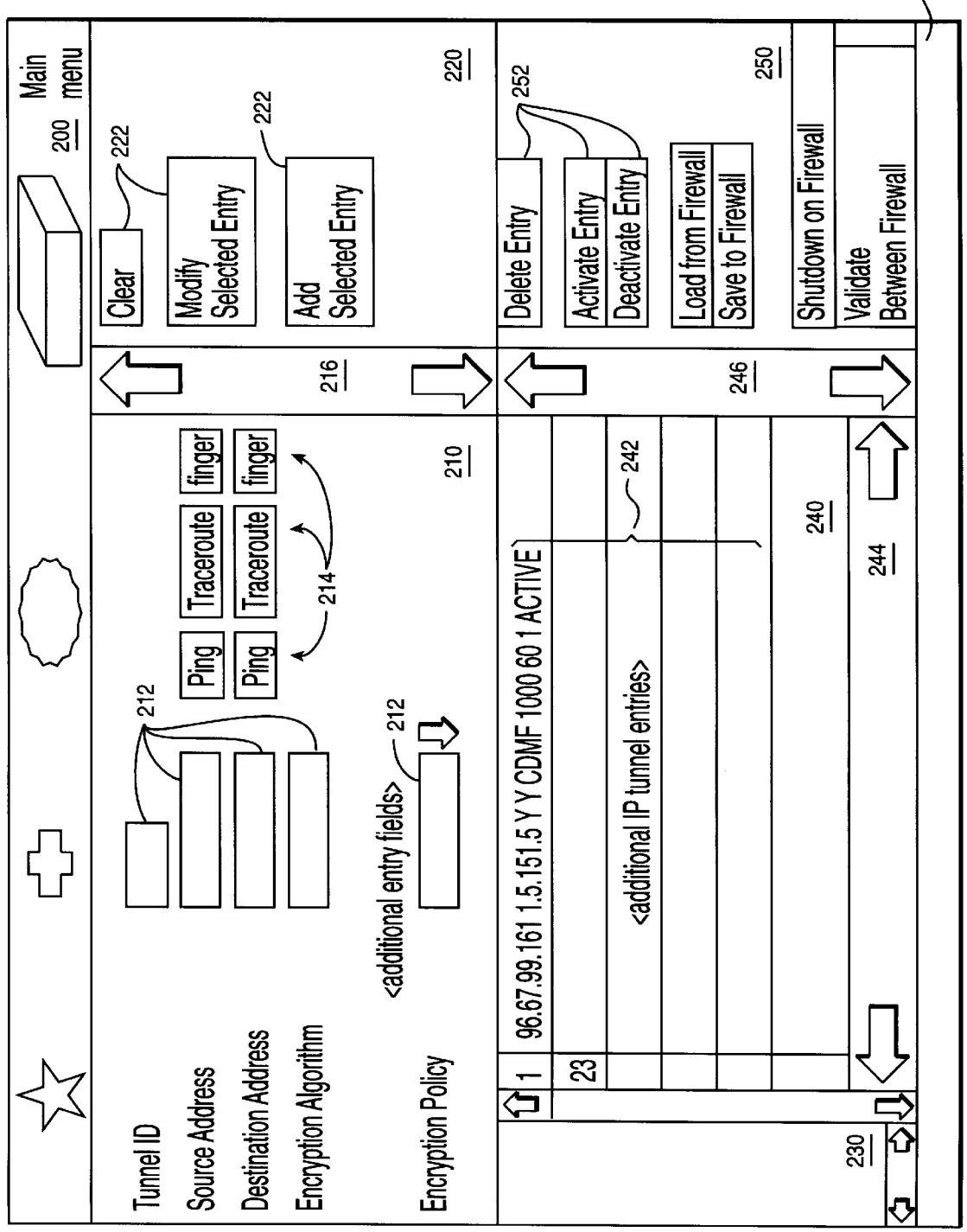
FIG. 4 shows the IP Tunnel Definition Page in a web based user interface.

The layout of a typical page is as follows. Please refer to FIG. 4 wherein the IP Tunnel Definition Page is shown. A navigation pane 200 runs across the top of the page. From this pane, administrators can select text or icons to navigate to other parts of the administration module or other modules in the firewall interface.

Below the navigation pane 200 lies the display pane 210 and display action pane 220. The display pane 210 provides a place for the page to display entry fields 212 or pushbuttons 214 to activate functions. A scroll bar 216 can be provided for additional entry fields. In other panels, a graphical depiction of the primary information on the page is displayed in this space. For the IP tunnel graph page, this pane would show connections between secure networks in pictorial form.

The display action pane 220 presents actions the administrator can initiate by pushbuttons 222, such as modifying or saving the definition of an object in the display pane, or view the results of actions (not shown) initiated by the administrator.

The next level of the page is divided into the meter pane 230, list pane 240, and list action pane 250. The main pane in this level is the list pane 240 which allows the administrator to view all the entries pertaining to the given pane. For the IP tunnel definition page, the list pane will show a list 242 of defined IP tunnels to the administrator. Scroll bars 244, 246 are optional features to display more entries or information about the entries.

The list action pane 250 operates in a similar fashion to the display action pane. The administrator can choose from a list of actions related to entries in the list pane by activating pushbuttons 252, such as storing a complete list of IP filter rules or exporting the list of IP tunnel definitions to the target endpoint firewalls.

The meter pane 230 graphically or textually displays information related to statistics initiated by the display pane or the aggregate statistics in the list pane. In the Tunnel Definition Page, the output of a traceroute, ping or finger routine is displayed.

The ticker tape pane 260 rests at the bottom of the page. This pane provides the administrator with dynamic, statistical information about the entries and objects on the page. The information scrolls from right to left and is updated as the administrator initiates actions on the page.

In the preferred embodiment, the web-based administration pages can be used in any web browser that supports html and Java(TM) applets, such as the Netscape Navigator (TM) browser. As will be seen with reference to the attached figures, all the web pages present a consistent, and thus familiar, layout to the administrator.

The IP Tunnel Definition Page will be described in greater detail. The IP Tunnel Definition Page provides the administrator with the ability to perform the following actions:

View the stored IP tunnel definitions on a firewall,
Create new IP tunnel definitions,
Modify stored IP tunnel definitions,
Load and save IP tunnel definitions,
Distribute stored IP tunnel definitions,
Distribute stored IP tunnel definitions,
Activate or deactivate stored IP tunnel definitions,
Shutdown IP tunnel definitions, and
Validate IP Tunnel definitions between two firewalls.

The administrator can create or modify an IP tunnel definition using the entry fields 212 and list boxes 214 in the display pane 210 and the pushbutton 222 actions in the display action pane 222. The list pane 240 displays all the IP tunnel definitions defined for the internet firewall. The administrator can scroll through them, highlight an IP tunnel definition for modification or deletion, and select an action by pushbutton 252 on the list action pane 250 to perform an operation on the IP tunnel definitions, such as exporting them to the firewall.

If the administrator can access target IP addresses on the host from which the web administration browser is run, the administrator can also ping, traceroute, and finger target IP addresses by pressing the appropriate button next to the entry field. For example, if the administrator presses the ping button next to the source address, the interface will execute the ping process in the source address field. The output for these actions will appear in the meter pane 230 and ticker tape pane 260 in different manners. This function gives the administrator a convenient way to determine if IP addresses are reachable or identifiable without having to leave the interface. The ticker tape pane will also display statistical information about the IP tunnel definitions, such as the number of tunnels defined between the same source and destination addresses, when not in use for displaying the output of a ping or finger function.

Not all the system actions which can be initiated from the interface shown in this figure are described, but they are representative of the actions that can be performed on this web page.

Figure 5:
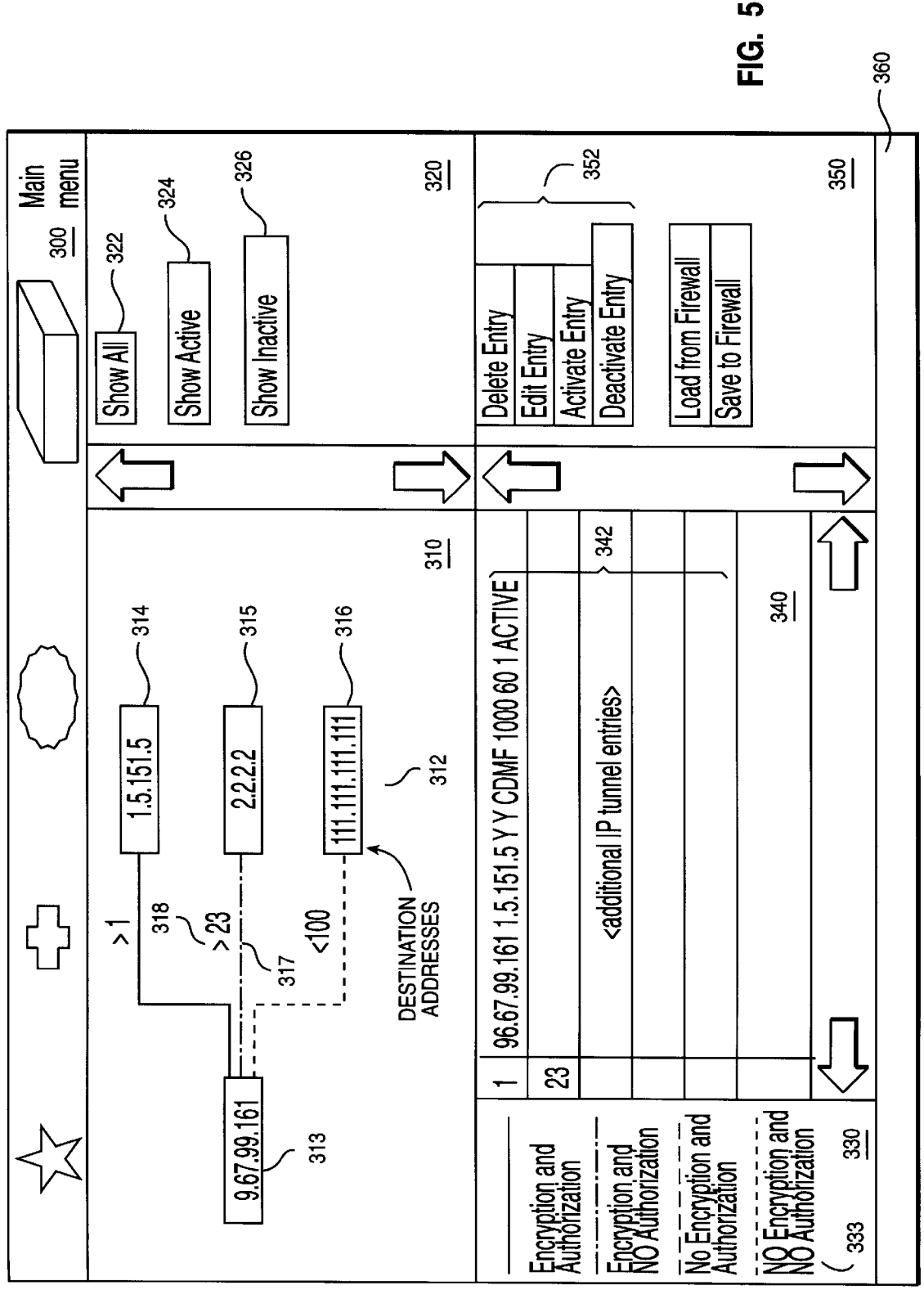
FIG. 5 depicts the IP Tunnel Graph Page in a web based user interface.

The IP Tunnel Graph Page depicted in FIG. 5 provides the administrator with the ability to graphically view the defined IP tunnels between two internet firewalls. The web page shows the graph 312 in the display pane 310 with a box 313 representing the source address of the firewall on the left side of the pane and boxes 314, 315, 316 representing the destination addresses of the target firewalls on the right side of the pane. Where IP tunnels are defined between two addresses, the web page draws a line 317 between the two boxes and labels the line with a symbol 318 to indicate which address initiates the tunnel and the ID of the IP tunnel. The lines are drawn in different shades to indicate a property such as a security status, i.e. whether the tunnel is enabled for encryption or authorization or some combination thereof. The display action pane 320 allows the administrator to see all the defined IP tunnel definitions, only those that are active on the firewall, or only those that are inactive on the firewall by pressing buttons 322, 324 326.

The meter pane 330 displays the legend 333 of the IP tunnel lines in the display pane. In one preferred embodiment, this pane displays other dynamic information as well.

The list pane will display a scrollable list 342 of all the IP tunnel definitions defined for the firewall. The administrator could select an IP tunnel line in the display pane 310 to have the web page highlight and show the full tunnel definition 342 in the list pane 340. The list action pane 350 through the pushbuttons 352 allows the administrator to load or save a list of IP tunnel definitions on a firewall, as well as activate, deactivate, edit, or delete a selected IP tunnel definition.

Not all the actions shown in this figure are described, but they are representative of the actions that can be performed on this web page.

Figure 6:
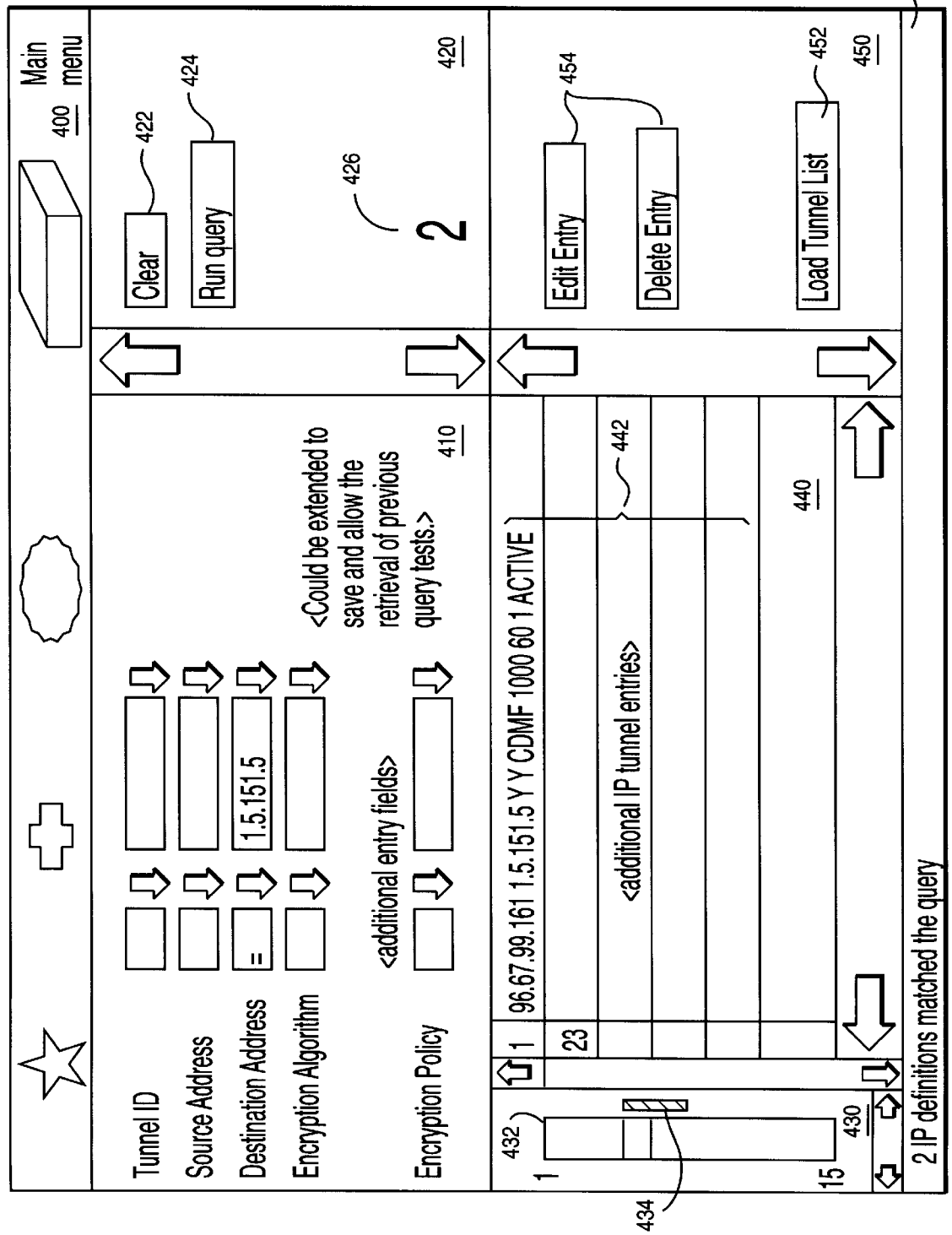
FIG. 6 shows the IP Tunnel Query Page in the user interface.

The IP Tunnel Query Page is depicted in FIG. 6 and provides the administrator with the ability to run queries against the set of stored IP tunnel definitions to see all the definitions that match the query. The queries also support wildcards. For example, the administrator could specify the destination address with a wildcard which would return any IP tunnel definitions which matched the other criteria specified in the query for any destination.

The administrator can define the query in the display pane 410 of the query page. Entry fields for Tunnel ID, Source Address, Destination Address and Encryption Algorithm and policy are provided. In one preferred embodiment, the prior queries can be saved, retrieved and displayed as models for new queries or to be run again unmodified. It is advantageous to save a query which is expected to be run repeatedly. Selection list derived from the IP tunnel values in the list presents a list of the IP Tunnel IDs or addresses from the set of IDs and addresses in the list of IP Tunnels.

As shown, the display action pane 420 provides two actions to the administrator, one pushbutton 422 to clear the display pane and the other 424 to run the query defined in the display pane. The display action pane 420 also displays a large number 426 indicating the number of IP tunnel definitions that matched the query test.

The meter pane 430 displays a graphical bar 432 which visually indicates the distribution of the matched IP tunnel definitions. Those IP tunnel definitions that matched the query are marked in a different color than the rest of the bar. The bar 432 is called a scatter bar, since it visually and quickly shows the IP tunnel definitions that matched the query and their distribution in the IP tunnel definition list. A small bar 434 next to the scatter bar 432 is used as a positional cue to show the IP tunnel definitions which are currently displayed in the list pane 440. The small bar 434 or a second small bar may also be used to indicate an area within the list where the matching or most of the matching tunnel definition are found.

The list pane 440 will display a scrollable list 442 of all the IP tunnel definitions defined for the firewall. The IP tunnel definitions that matched the query are displayed in a different color, or otherwise highlighted. The administrator can select (or highlight) an entry to edit or delete it from the IP tunnel definition list. For readability, the IP tunnel entries will be divided into columns, so that all the source addresses are lined up horizontally, etc.

The list action pane 450 allows the administrator to load a list of IP tunnel definitions on a firewall by activating the load tunnel list pushbutton 452. Also, it allows the administrator to edit a selected IP tunnel definition by activating the edit entry pushbutton 454. Pressing the Edit Entry pushbutton brings the administrator back to the IP Tunnel Definition Page with the definition of the selected entry displayed therein.

Figure 7:
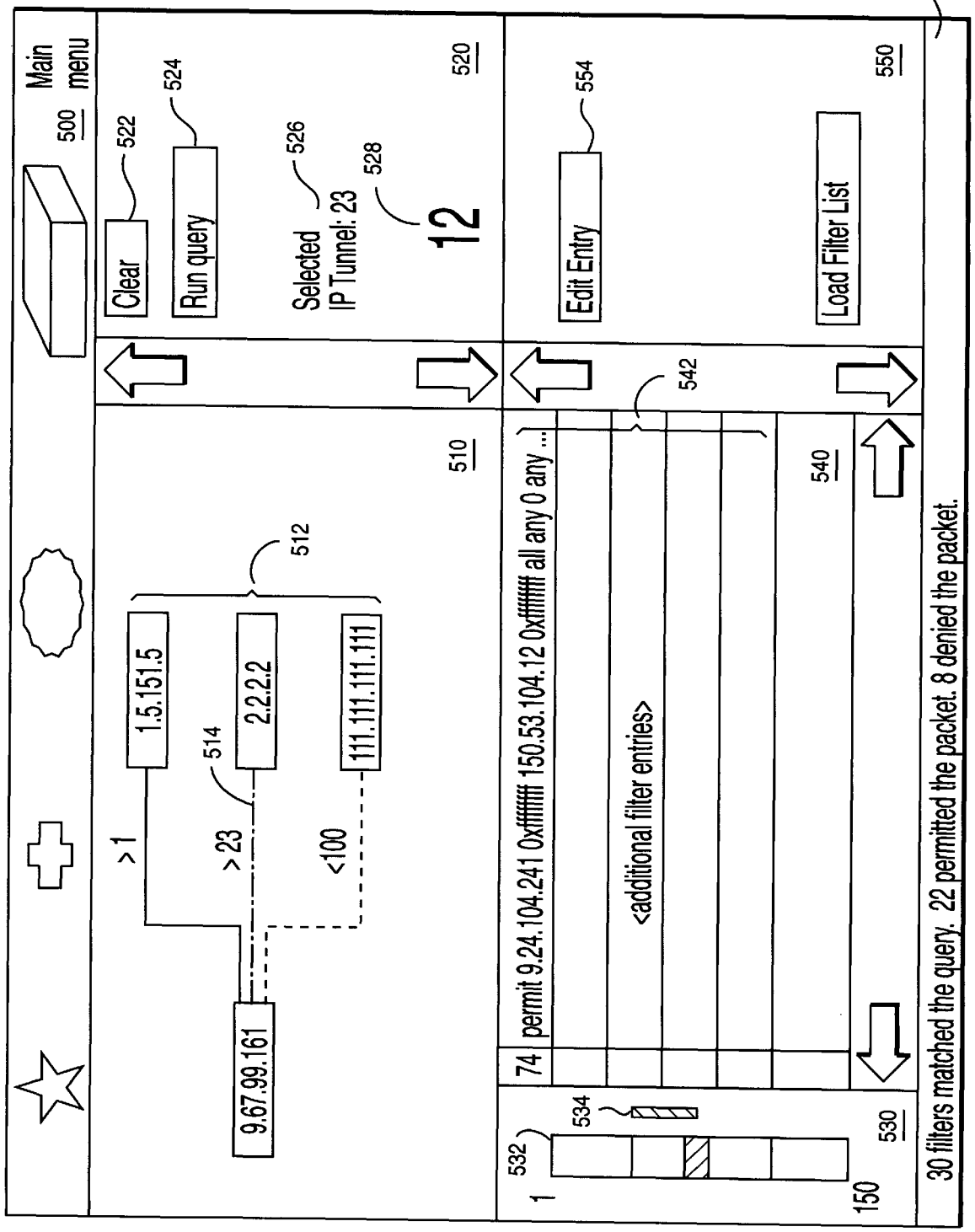
FIG. 7 shows the IP Tunnel/Filter Query Page in the user interface.

Referring to FIG. 7, the IP Tunnel/Filter Query Page is shown. This page brings together the two separate definition groups on an internet firewall, IP tunnel and IP filter definitions. The IP filter groups are described in the crossreferenced, copending application incorporated by reference above. It allows the administrator to execute queries against the list of IP filter rules based on selections on the same IP tunnel graph as shown on the IP Tunnel Graph Page. This graph 512 is shown in the display pane 510. Selecting an IP Tunnel line 514 in the graph and the run query button 524 in the display action pane will generate a query against the firewall filter rules list. IP filter rules need not contain IP tunnel information, but an administrator, for example, can define an acceptance filter rule to route all IP packets from a specified source address, destination address and port number through an IP tunnel that was defined with encryption.

The display action pane 520 provides two action selections to the administrator, one button 522 to clear the highlighted IP tunnel selection in display pane and the other button 524 to run the query defined in the display pane based on the selected IP tunnel line. The display action pane also displays the ID 526 of the selected IP tunnel and a number 528 in a large font indicating the number of IP filter rules that matched the query test.

As with the IP Tunnel Query Page, the meter pane 530 displays a graphical bar 532, but in this case visually indicates the distribution of the matched IP filter rules. Those IP filter rules that matched the query are marked in a different color than the rest of the bar. The bar 532 is called a scatter bar, since it visually and quickly shows the IP filter rules that matched the query and their distribution in the IP filter rules list. A small bar 534 next to the scatter bar is used as a positional cue to show the IP filter rules currently displayed in the list pane 540.

The list pane 540 shows a list 542 of all the IP filter rules defined on the firewall. Once the administrator selects a line 514 in the display pane 510 which represents an IP tunnel definition, the web page will color all the IP filter rules in the list 542 that are defined with the same IP tunnel ID. The IP filter rules that matched the query are preferably displayed in a different color, as opposed to highlighting the entries, since highlighting is reserved for selection in the interface. The administrator can select an entry in the list to edit it from the filter list.

The list action pane 550 allows the administrator to load a list of IP filter rules on a firewall by pressing the load filter list pushbutton 552. In addition, it allows the administrator to edit a selected IP filter rule by pressing the edit pushbuttons 554. Editing a filter rule is described in the cross-referenced application at a Filter Definition Page.

DATA STRUCTURES FOR IP TUNNEL PAGES
IPTunnelTable Structure
   Number of IPTunnel Structures
   Pointer to IPTunnel Structures
PTunnel Structure
   Tunnel ID
   Target Address
   Local Address
   Encryption Algorithm
   Session Key Lifetime
   Session Key Refresh Time
   Initiator
   Authentication Policy
   Encryption Policy
   < . . . other variables customizable to each firewall . . . >
   Comment
IP Tunnel Definition Page Data Structures
   ListPane modified status bit
   ListPane IPTunnelTable structure
   DisplayPane modified status bit
   DisplayPane IPTunnel structure
IP Tunnel Graph Page Data Structures
   DisplayPane IPTunnelTable structure
   ListPane IPTunnelTable structure
   Temporary IPTunnel structure
IP Tunnel Query Page Data Structures
   DisplayPane IPTunnel structure
   DisplayActionPane matched tunnel number
   MeterPane upper bound
   MeterPane matched IPTunnelTable
   ListPane IPTunnelTable structure
   Temporary IPTunnel structure
IP Tunnel/Filter Query Page Data Structures
   DisplayPane IPTunnelTable structure
   DisplayActionPane matched filter number
   MeterPane upper bound
   MeterPane matched FilterRuleTable structure
   ListPane FilterRuleTable structure
   Temporary FilterRule structure The data structures listed above include the IPTunnelTable structure. This structure holds all the IP tunnels defined on the firewall. The IPTunnel structure represents all the attributes of a single tunnel definition. For example, the local and target addresses in a tunnel definition are used to establish the source and destination firewall machines on the end points of the IP tunnel. Additional IP tunnel attributes include the type of encryption algorithm and the authentication policy established for IP packets passing through the IP tunnel.

The IP Tunnel Definition Page data structures contains the data structures used to display and keep track of information on this Page. The ListPane modified status bit indicates if tunnel definitions have been added to list of IP tunnels since the tunnel definitions were last loaded into the interface. The ListPane IPTunnelTable is the set of tunnel definitions loaded from the firewall. The DisplayPane modified status bit indicates if the administrator has changed any information on the DisplayPane. The DisplayPane IPTunnel structure holds all the values displayed in the display pane itself.

The IP Tunnel Graph Page data structures contain the data structures used to display and keep track of information on this page. DisplayPane IPTunnelTable is the set of tunnel definitions loaded from the firewall and this information is used to graph the tunnels in this pane. The ListPane IPTunnelTable is the set of tunnel definitions loaded from the firewall. The Temporary IPTunnel structure is used to hold a selected IP tunnel definition that is used when transferring information to the IP Tunnel Definition Page as a result of an administrator's action on the page.

The IP Tunnel Query Page data structures contains the data structures used to display and keep track of information on this page. The DisplayPane IPTunnel structure holds all the values displayed in the display pane itself. The DisplayActionPane matched tunnel number is the number of tunnel definitions loaded in the interface that match the query specification of the IP tunnel in the display pane. The MeterPane upper bound is the number of tunnel definitions loaded in the interface. The MeterPane matched IPTunnelTable is a set of those tunnel definitions loaded in the interface that match the query specification of the IP tunnel in the display pane. The ListPane IPTunnelTable is the set of tunnel definitions loaded from the firewall. The Temporary IPTunnel structure is used to hold a selected IP tunnel definition that is used when transferring information to the IP Tunnel Definition Page as a result of an administrator's action on the page.

The IP Tunnel/Filter Query Page data structures contain the data structures used to display and keep track of information on this page. DisplayPane IPTunnelTable is the set of tunnel definitions loaded from the firewall and this information is used to graph the tunnels in this pane. The DisplayActionPane matched filter number is the number of IP filter rules loaded in the interface that match the selected IP tunnel ID in the display pane. The MeterPane upper bound is the number of filter rules loaded in the interface. The MeterPane matched FilterRuleTable is a set of those filter rules loaded in the interface that match the selected IP tunnel ID in the display pane. The ListPane FilterRuleTable is the set of IP filter rules loaded from the firewall. The Temporary FilterRule structure is used to hold a selected filter rule that is used when transferring information to the IP Filter Definition Page as a result of an administrator's action on the page.

Those skilled in the art would recognize that other data structures with other combinations of data could be used in alternate embodiments.

Figure 8:
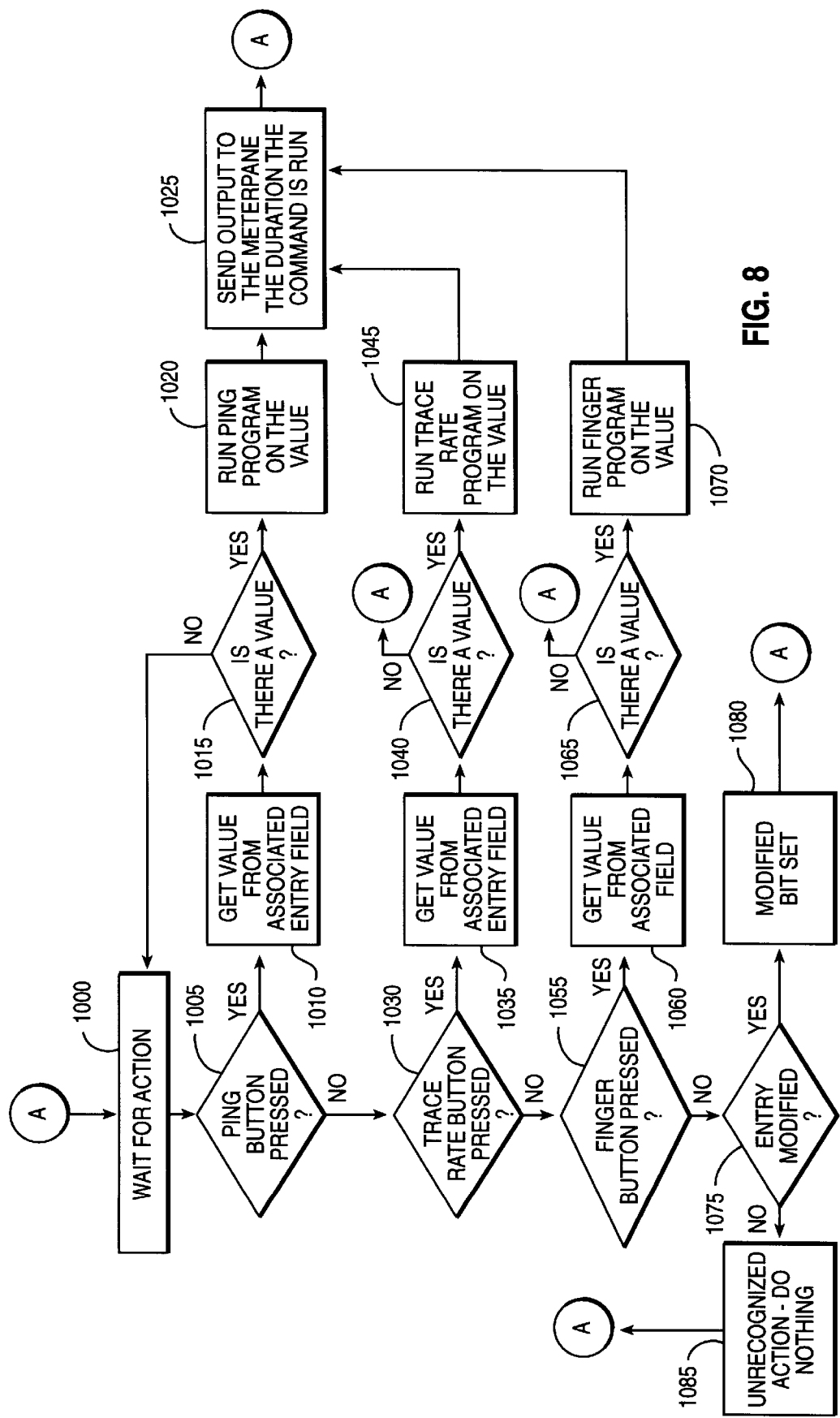
FIG. 8 is a flow diagram for the actions and display pane of the IP Tunnel Definition Page.

The process which the system takes in response to user input in the display pane of the IP Tunnel Definition Page is depicted in FIG. 8. The process begins in step 1000 where the system is waiting for the user input. In step 1005, the system determines whether the pane button was pressed. If so, in step 1010, the value from the associated entry field is fetched. The test in step 1015 determines whether there is a value in the associated entry field. If not, the system returns to step 1000. If there is a value in the entry field, the ping program is run on the value in step 1020. The process proceeds to step 1025 where the output of the ping program is sent the meter pane for the duration that the command is run. The administrator can view the success or failure of the ping in this way. The process returns to step 1000 to wait for further user action.

If the test in step 1005 is negative, the test in step 1030 determines whether the traceroute button was pressed. If so, in step 1035, the value from the associated entry field is fetched. Next, the step in 1040 determines whether there is a value in the entry field. If not, the process returns to step 1000. If there is a value in step 1045, the traceroute program is run on the value. The process proceeds to step 1025 where the output of the traceroute program is sent to the meter pane for the duration that the command is run. The process returns to step 1000.

If the test in step 1030 is negative, the test in step 1055 determines whether the finger button was pressed. If so, in step 1060, the value from the associated entry field is fetched. The test in step 1065 determines whether there is a value in the field, if not, process returns to step 1000. If so, in step 1070 the finger program is run on the value. The process proceeds to step 1025 where the results of the finger program are sent to the meter pane for the duration that the command is run. The system returns to step 1000.

If the finger button was not pressed in step 1075, a test determines whether an entry in the display pane was modified. If so, the modified bit is set in step 1080 and the process returns to step 1000. If no entry was modified in step 1085, it was an unrecognized action and the system will do nothing. The process returns to step 1000 to wait for user input.

Figure 9:
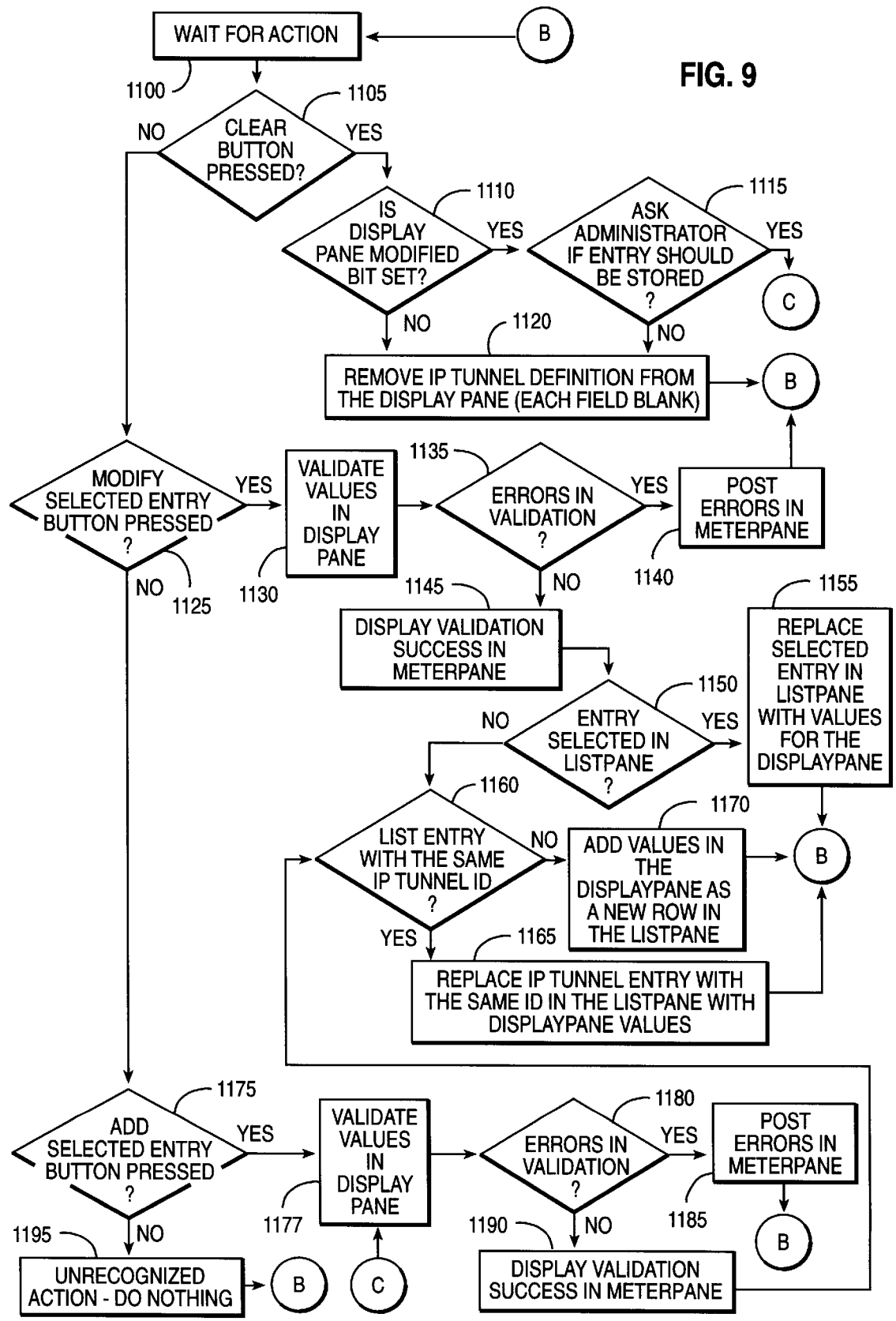
FIG. 9 is a flow diagram of the actions in the display action pane of the IP Tunnel Definition Page.

The process taken in response to user input in the display action pane of the IP Tunnel Definition Page is depicted in FIG. 9. The process begins in step 1100 where the system waits for user action. In step 1105, a test determines whether a clear button was pressed. If so, in step 1110, the test determines whether the display pane modified bit is set. If so, in step 1115, the administrator is queried to determine whether the entry should be stored. If not, in step 1120, the IP Tunnel Definition is removed from the display pane and each field is left blank. Process returns to step 1100 to wait for further user input. However, if the administrator indicates the entry should be stored, the process proceeds to step 1177 wherein values are validated in the display pane.

If the clear button was not pressed in step 1125, a test determines whether the modified selected entry button was pressed. If so, in step 1130, the values in the display pane are validated. In step 1135, a test is run to determine whether there were errors in the validation. If so, in step 1140, the errors are posted in the meter pane and the system returns to 1100 to wait for further user action. If there are no errors in validation, in step 1145, the validation success is displayed in the meter pane. The process proceeds to step 1150 where a test to determine whether an entry was selected in the list pane is conducted. If so, the selected entries replaced in the list pane with the values from the display pane and the process returns to step 1100. If no entry was selected in the list pane, step 1160 determines whether there is a list entry with the same IP tunnel ID. If there is, in step 1165, the IP tunnel entry with the same ID is replaced in the list pane with the display pane value. The process resumes waiting for user action. If there is no entry with same IP tunnel ID, in step 1170 the values in the display pane are added as a new row in the list pane. The process returns to step 1100.

In step 1175, a test is run to determine whether the add selected entry button was pressed. If so, in step 1177, the values in the display pane are validated. In step 1180, a test is run to determine whether there are errors in the validation. The errors, if any, are posted in the meter pane, step 1185 and the process returns to 1100. If there are no errors in validation, in step 1190, the success of the validation is displayed in the meter pane and the process proceeds to step 1160.

If none of the tests in steps 1105, 1125 and 1175 were successful, the process assumes that it is an unrecognized action and in step 1195 it does nothing. The process returns to step 1100 to wait for user input.

Figure 10:
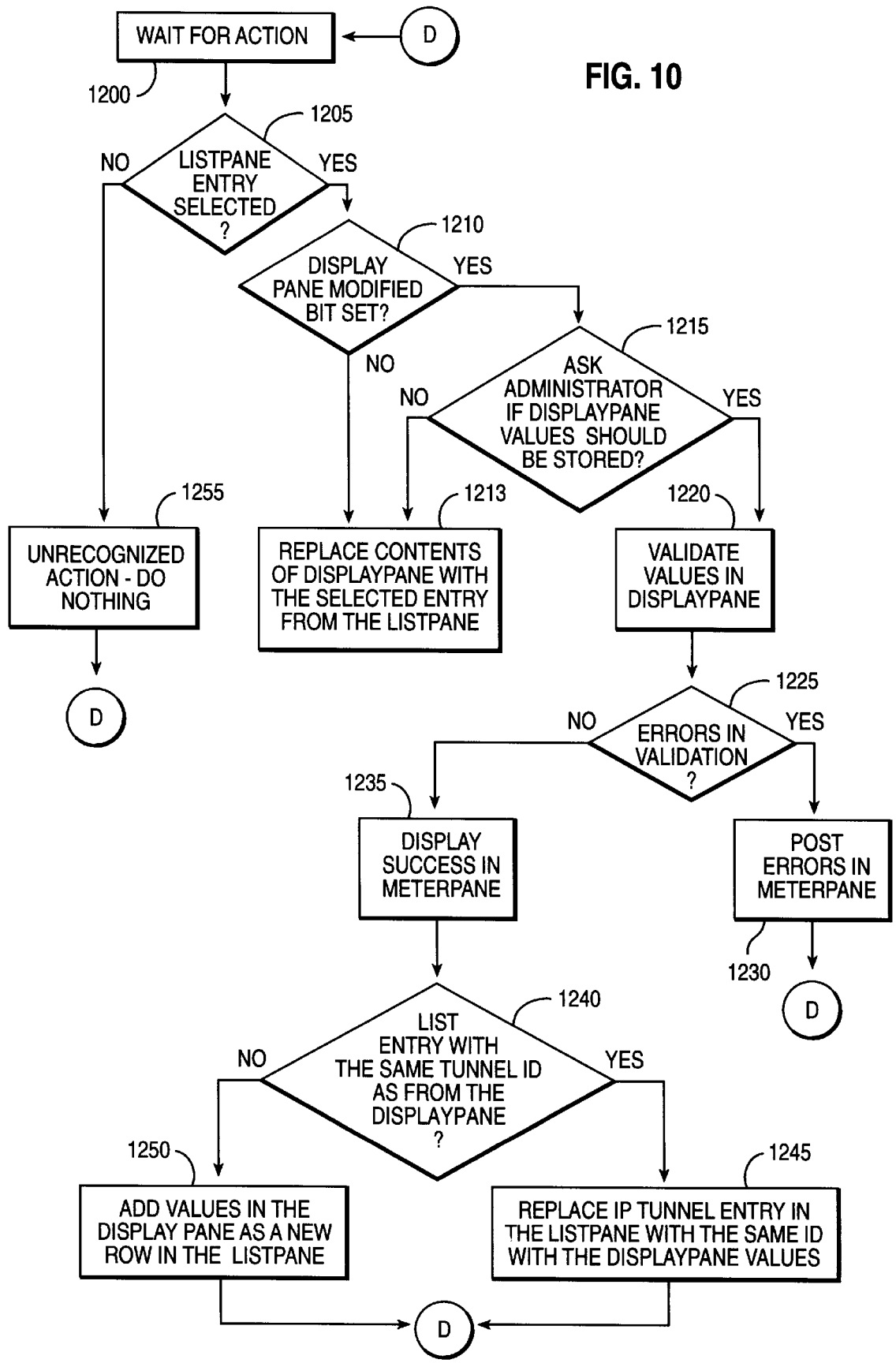
FIG. 10 is a flow diagram of the actions followed according to user input in the list pane of the IP Tunnel Definition Page.

The process responsive to user input in the list pane of the IP Tunnel Definition Page is depicted in FIG. 10. The process begins in step 1200 where the system waits for user action. In step 1205, a test determines whether a list pane entry was selected. If so, in step 1210, a test determines whether the display pane modified bit was set. If so, in step 1215, the administrator is queried as to whether the display pane values should be stored. If not, the contents of the display pane are replaced with a selected entry from the list pane in step 1213 and the system returns by 1200. If the administrator indicates that display pane values should be stored, in step 1220 the values in the display pane are validated. The test in step 1225 determines whether there are errors in validation. If so, in step 1230, these errors are posted in the meter pane. The process returns to step 1200. If there are no errors in step 1235, the success of the validation is displayed in the meter pane. In step 1240, a test determines if there is a list entry with the same tunnel ID as that from the display page. If there is, in step 1245, the IP Tunnel entry is replaced in a list pane with the same ID with the display pane values. In this case the administrator is modifying a Tunnel Definition that already exists. If the test in 1240 is negative, in step 1250 the values in the display pane are added as a new row in the list pane.

If step 1205 was negative, the action is unrecognized at step 1255 and processing continues to step 1200.

Figure 11A:
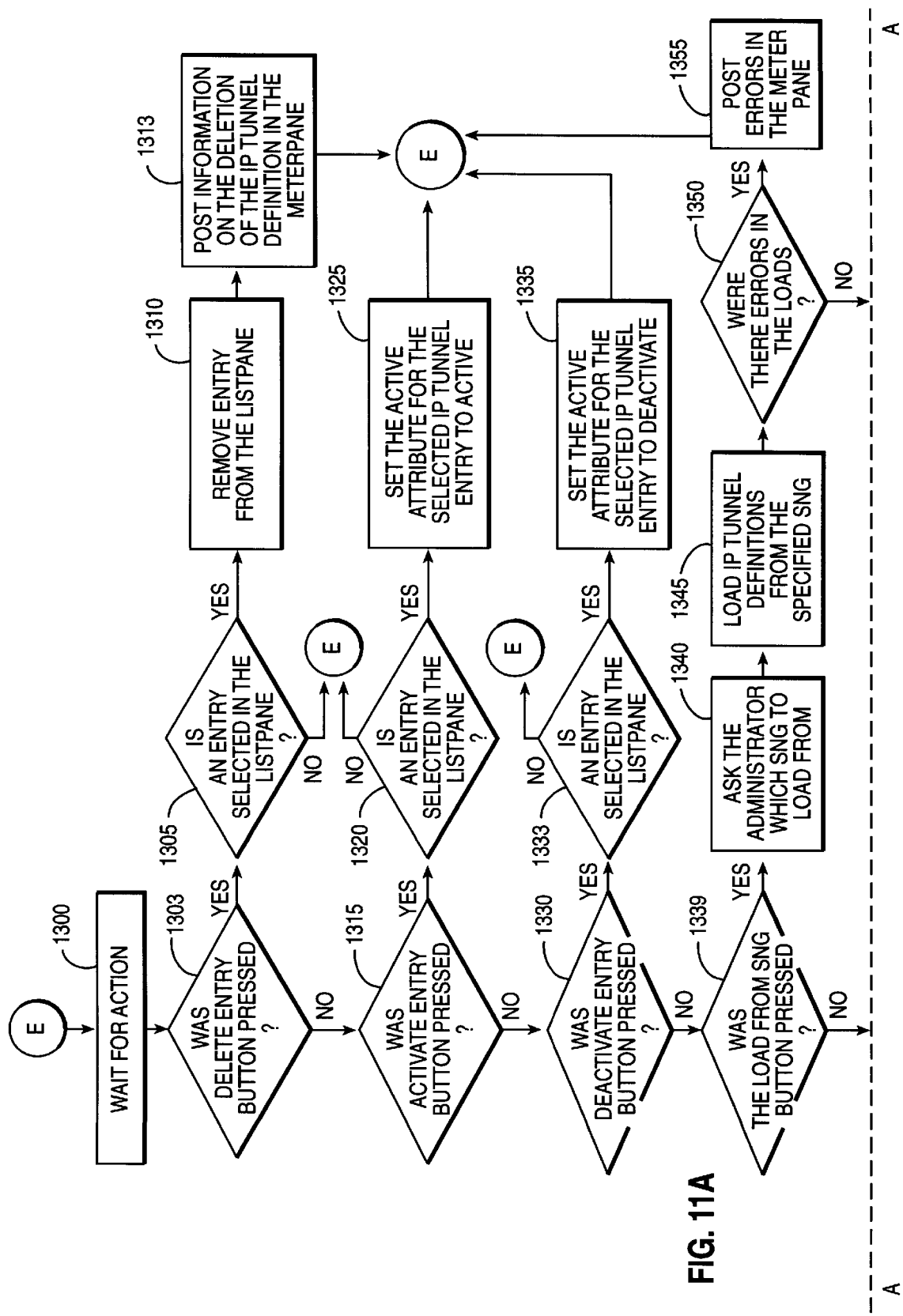
FIGS. 11A, 11B, and 11C are flow diagrams of the actions taken according to user input in the list action pane of the IP Tunnel Definition Page.
Figure 11B:
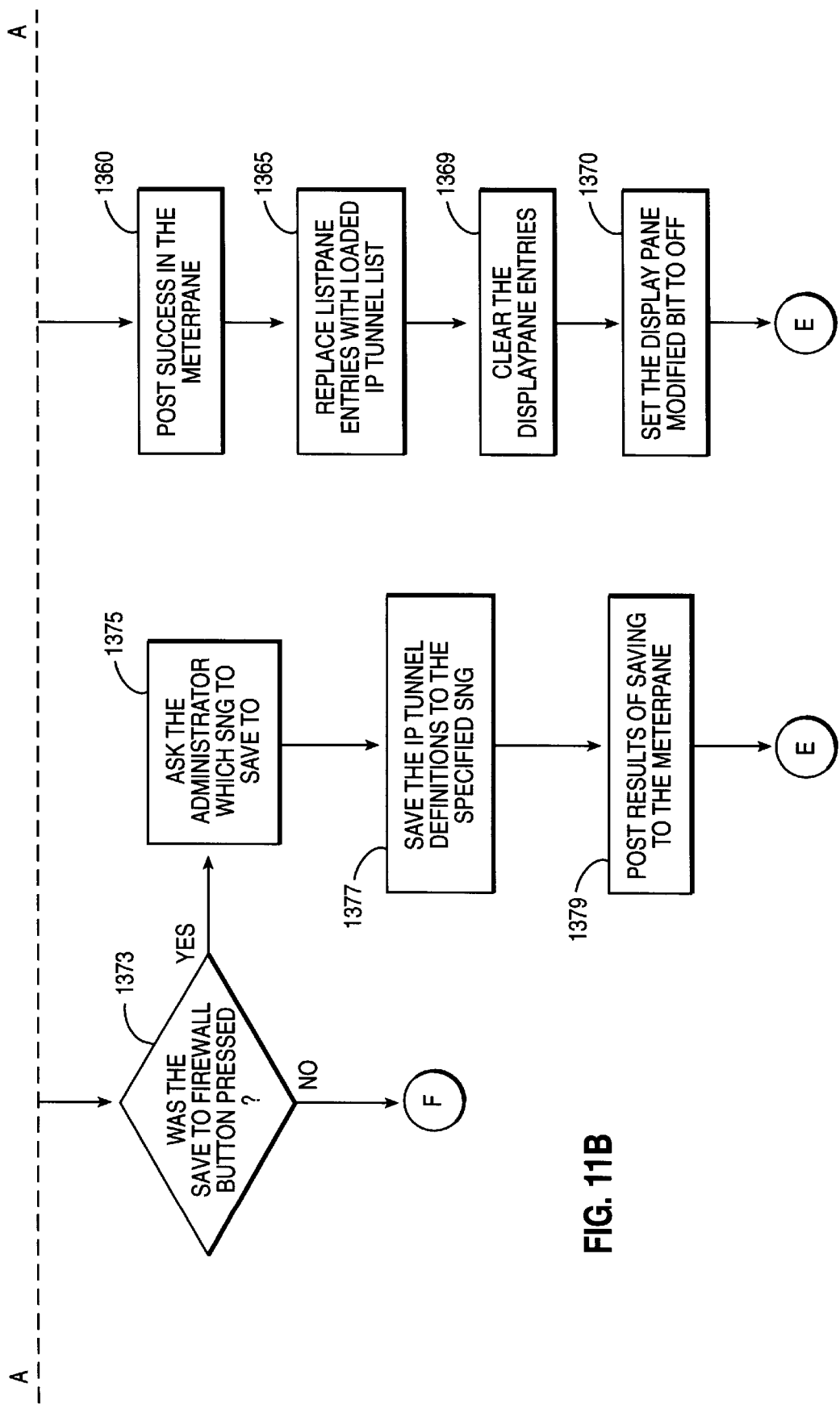
Figure 11C:
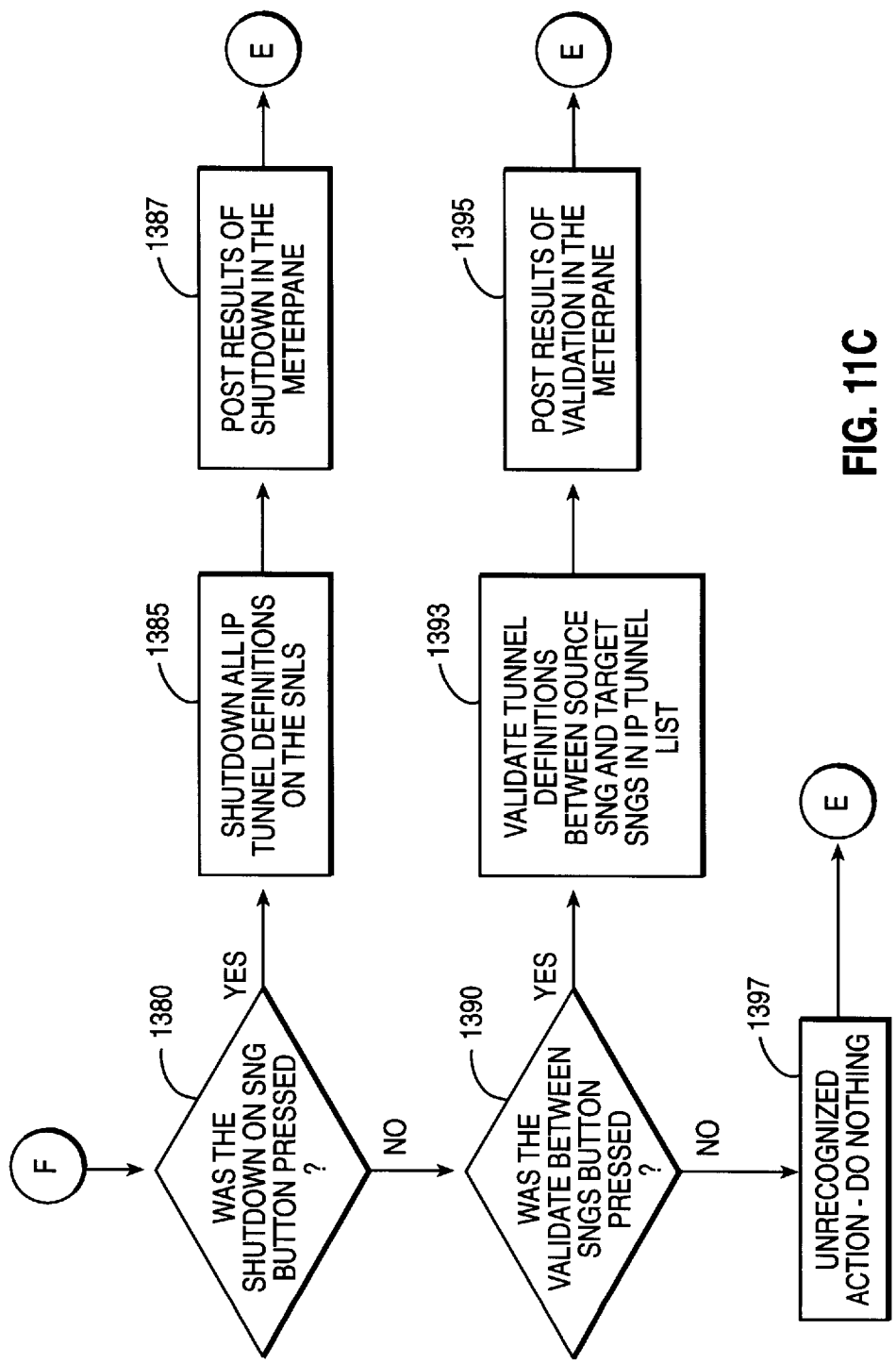

In FIGS. 11A, 11B, and 11C the process taken in response to user input in List Action pane in the IP Tunnel Definition Page is shown. In step 1300, the system waits for user input. In step 1303, a test determines whether the delete entry button was pressed. If so, in step 1305, the system determines whether an entry was selected in the list pane. If not, the system returns to step 1300 to wait for further user input. If an entry was selected in step 1310, the selected entry is removed from the list pane. In step 1313, the deletion of the entry is posted on the meter pane in the IP Tunnel Definition Page. The process returns to step 1300.

In step 1315, whether the user pressed the activate entry button is determined. If the activate entry button is pressed, in step 1320, the system determines whether an entry was selected in the list pane. If not, the process returns to step 1300. If there is a selected entry in step 1325, the active attribute for the selected IP tunnel entry is set to active. The process returns to wait for user action. An active tunnel is one that the firewall can send IP packets through if the filter rules are defined to route matching packets through that IP Tunnel. An IP Tunnel can be defined, but not made active to accept IP packets.

In step 1330, the test determines whether the deactivate entry button was pressed. If so, in step 1333, a test determines whether an entry was selected in the list pane. If not, the system returns to wait for user action at step 1300. If an entry was selected in step 1335, the active attribute for the selected IP tunnel entry is set to deactivate and the process returns to step 1300.

The test in step 1339 determines whether the load from the firewall button was pressed. If so, in step 1340, the administrator is queried for which firewall from which to load the IP Tunnel definitions. In step 1345, the IP tunnel definitions from the specified firewall are loaded. The test in step 1350 determines whether there are errors in the loading. If there were, in step 1355, the errors are posted into the meter pane. If not, in step 1360, the success of the loading is posted in the meter pane. In step 1365, the list pane entries are replaced with the loaded IP tunnel list. In step 1369, the display pane entries are cleared. In step 1370, the display pane modified bit is set off. The process returns to step 1300 to wait for user input.

In step 1373, the system determines whether the save to firewall button was pressed. If so, the administrator is queried as to which firewall the IP tunnel definition should be saved in step 1375. In step 1377, the IP tunnel definitions are saved to the specified firewall. The results of saving, step 1379, are posted in the meter pane. Next, the process returns to step 1300.

In step 1380, the system determines whether the shut down a firewall button was pressed. If this button was pressed in step 1385 all the IP tunnel definitions on the firewalls are shut-down or made inactive. In step 1387, the results of the shut down are posted in the meter pane in step 1395.

In step 1390, the system determines whether the validate between firewalls button was pressed. If so, in step 1393, the tunnel definitions between the firewalls, the source firewall and the target firewall is validated in the IP tunnel list. The results of that validation is posted in the meter pane in step 1395. The validation process is the same as provided by the firewall. In step 1397, the system determines that the action is an unrecognized action and does nothing. At this point, the process returns to step 1300 to wait for further user input.

Figure 12:
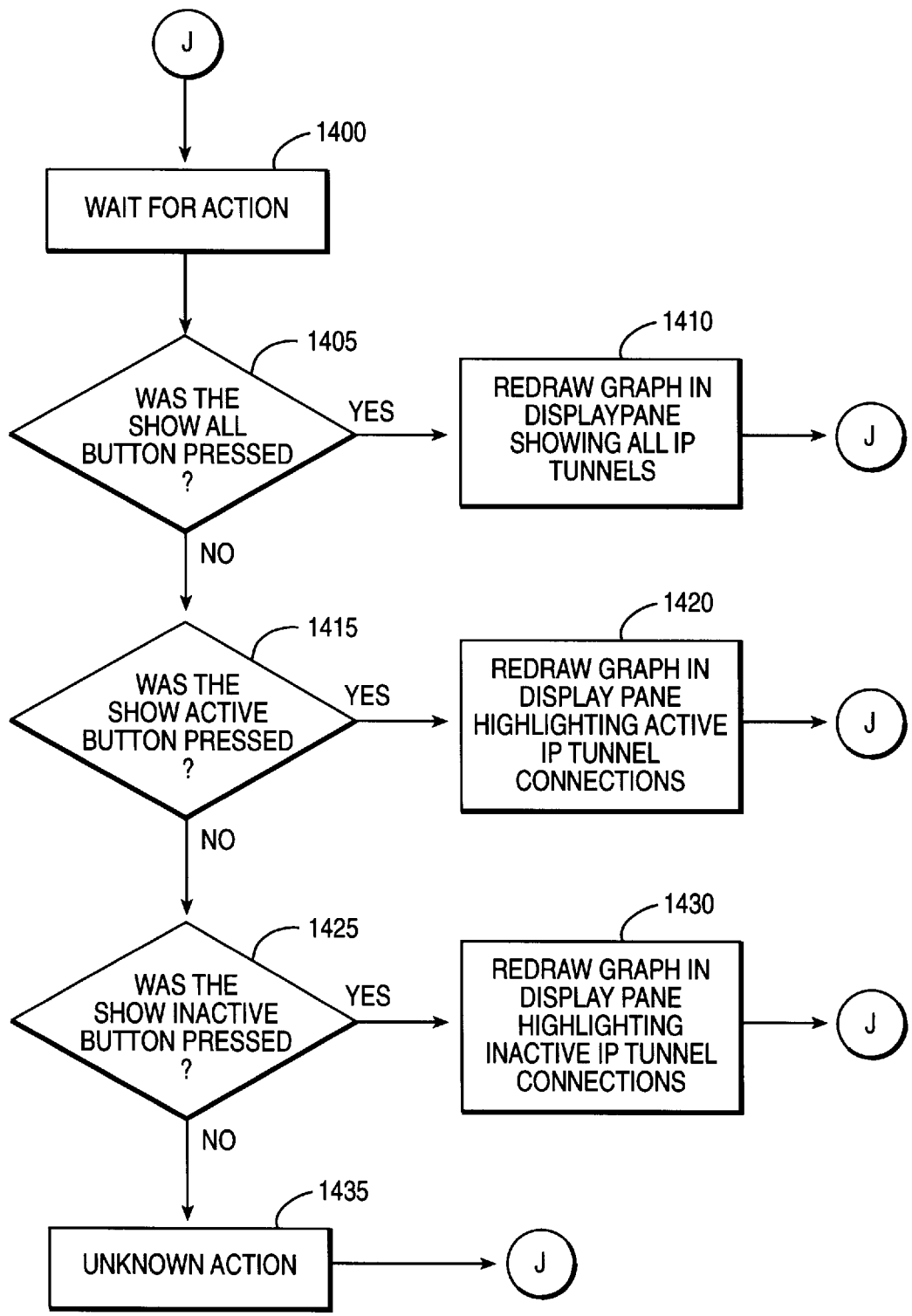
FIG. 12 depicts the processes responsive to user input in the display action pane of the IP Tunnel Graph Page.

The system actions taken response to user input to the display action pane of the IP Tunnel Graph Page are depicted in FIG. 12. The process begins in step 1400 where the system waits for user action. In step 1405, the system determines whether the show all button was pressed. If so, in step 1410, the graph in the display pane was redrawn showing all the IP tunnels. The process returns to step 1400. In step 1415, the system determines whether the show active button was pressed. If so, in step 1420, the graph is redrawn in the display pane highlighting the active IP tunnel connections. The process returns to step 1400. In step 1425, the system determines whether the show inactive button was pressed. If so, in step 1430, the graph is redrawn in the display pane highlighting the inactive IP tunnel connections. In step 1435, the system classifies the user input as an unknown action and returns to step 1400 to wait for further user input.

Figure 13A:
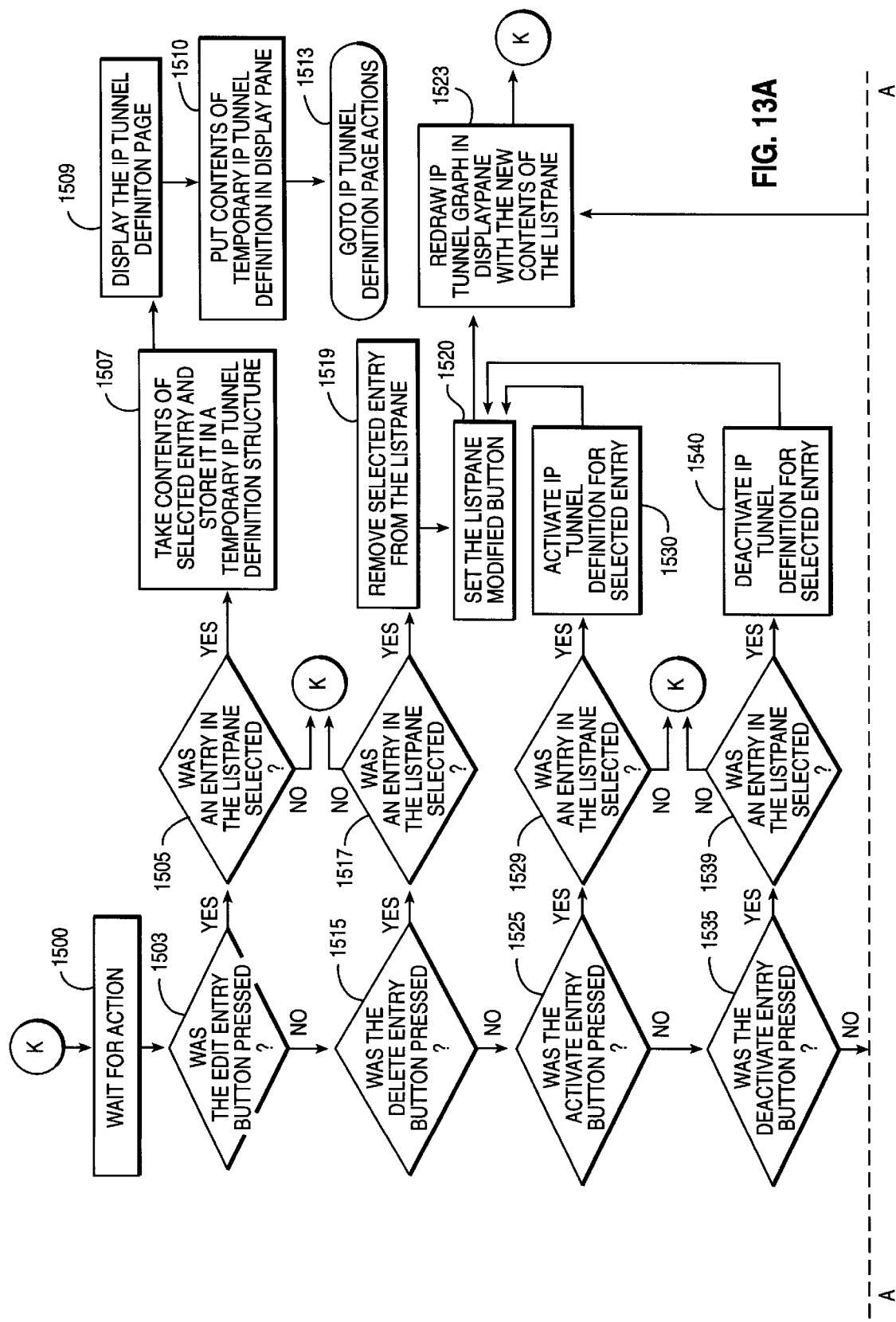
FIGS. 13A, 13B and 13C display the system actions from input in the list action pane in the IP Tunnel Graph Page.
Figure 13B:
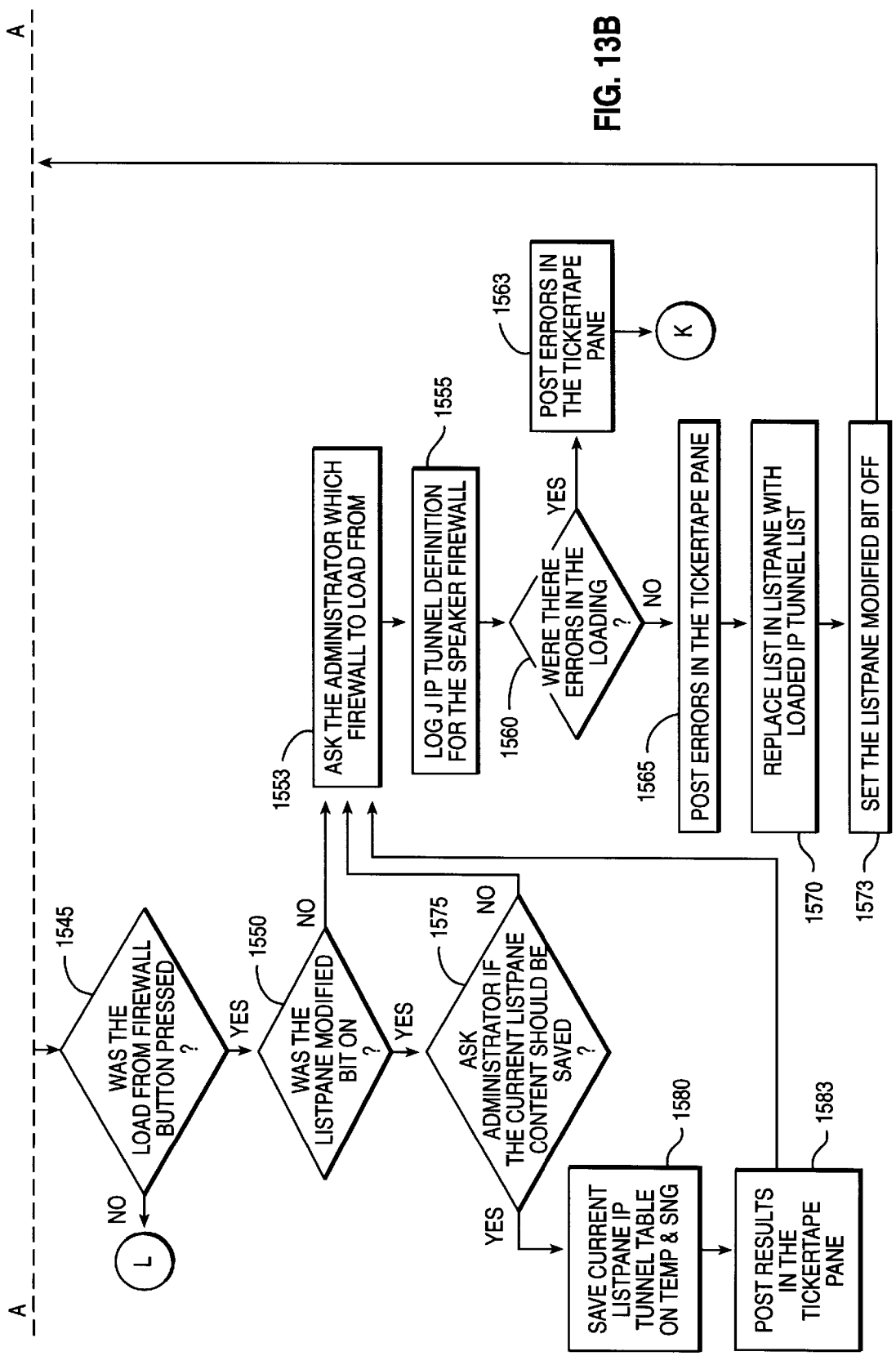
Figure 13C:
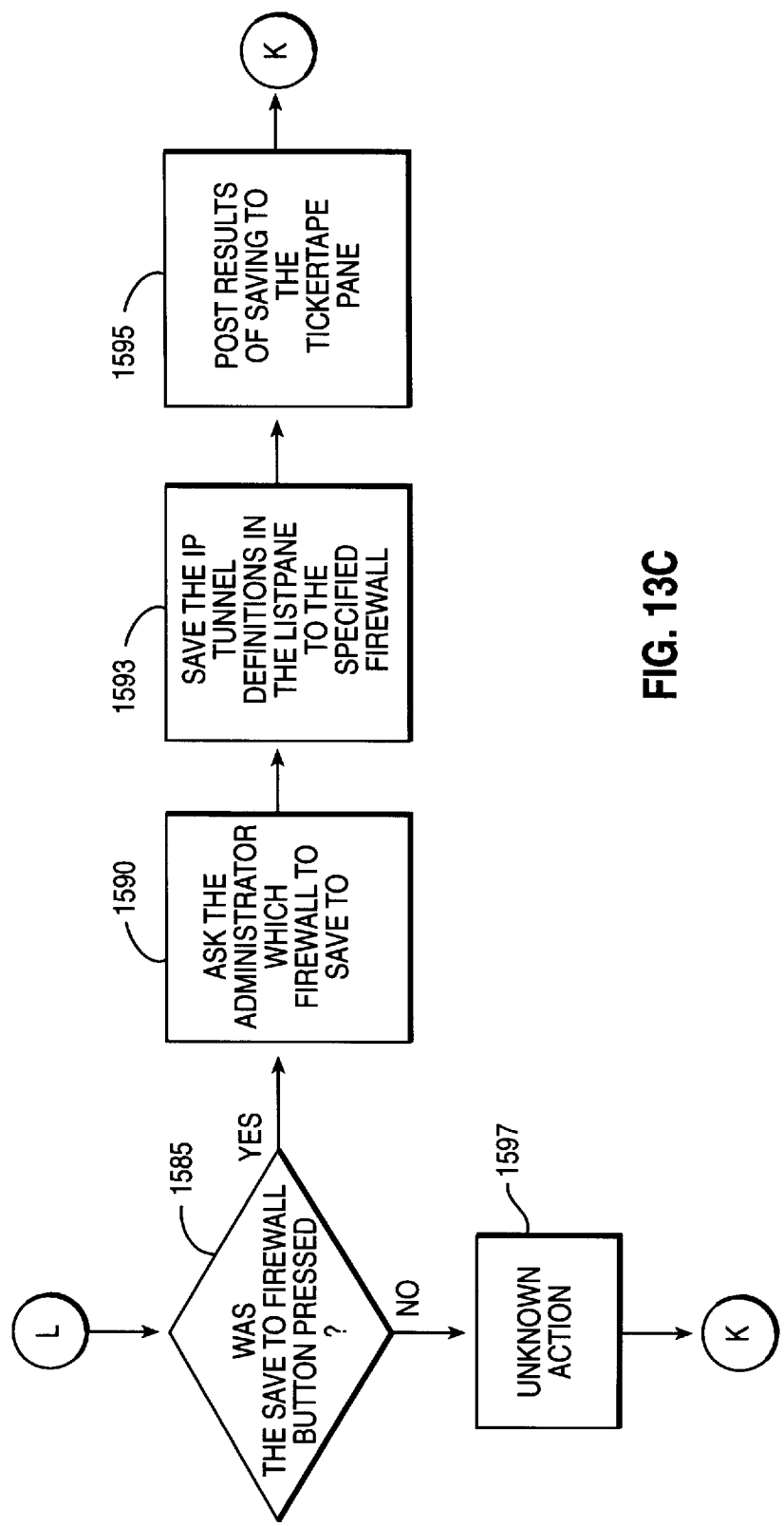

System actions in response to user input in the list action pane in the IP Tunnel Graph Page are depicted in FIGS. 13A, 13B, and 13C. In step 1500, the process begins as a system waits for user action. In step 1503, the system determines whether the added entry button was pressed. If so, in step 1505, a test determines whether an entry in list pane was selected. If not, the process returns to step 1500 to wait for user input. If so, in step 1507, the contents of the selected entry are stored in a temporary IP tunnel definition structure. In step 1509, the IP Tunnel Definition Page is displayed. The contents of the temporary IP tunnel definition are displayed in a display pane step 1510 and the process goes to the IP Tunnel Definition Page actions depicted in FIGS. 11A–11C, 12, 13A—13C.

In step 1515, the system determines whether the delete entry button was pressed. If so, in step 1517 determines whether an entry in the list pane was selected. If not, the process returns to step 1500 to wait for user input. If so, in step 1519, the selected entry is removed from the list pane and in step 1520 the list pane modified bit is set on. In step 1523, the IP Tunnel Graph is redrawn to reflect the new contents of the list pane. The process returns to wait for user input step 1500.

In step 1525, the system determines whether the activate entry button was pressed. If so, in step 1529, the system determines whether an entry in the list pane was selected. If so, the IP tunnel definition for the selected entry is activated in step 1530 and the process returns to step 1520.

In step 1535, the system determines whether the deactivate entry button was pressed. If so, in step 1539 determines whether an entry in the list pane was selected. If so, the IP tunnel definition for the selected entry is deactivated in step 1540. The process returns to step 1520 to set the list pane modified button, and in step 1523 the IP tunnel graph is redrawn.

In step 1545, the system determines whether the load from firewall button was pressed. If so, step 1550 determines whether the list pane modified bit was on. If not, the administrator is asked from which firewall to load in step 1553. In step 1555, the IP tunnel definition from the specified firewall is loaded. In step 1560, a test determines whether there were any errors in the loading. If so, the errors were posted in the ticker tape pane in step 1563 and the process returns to step 1500. If there are no errors in the loading in step 1565, the success is posted in the ticker tape pane. The IP tunnel list in the list pane is replaced with the loaded IP tunnel list in step 1570. In step 1573, the list pane modified bit is set off. The process returns to step 1523 where the IP tunnel graph is redrawn in the display pane.

In step 1575, the administrator is asked whether the current list pane contents should be saved. If the administrator indicates to save the list pane contents, in step 1580, the contents are saved as an IP tunnel table on the target firewall. In step 1583, the results are posted in the ticker tape pane. At this point, the process returns to step 1553 to query the administrator as to which firewall to load from.

In step 1385, the system determines whether save to firewall button was pressed. If so, in step 1590, the administrator is asked as to which firewall to save. In step 1593, the IP tunnel definitions in the list pane are saved to the specified firewall. The results of the saving are posted in the Ticker Tape pane, step 1595. The process returns step 1500 to wait for user input. In step 1597, the action is classified as an unknown action and the process returns to wait for user input to step 1500.

Figure 14:
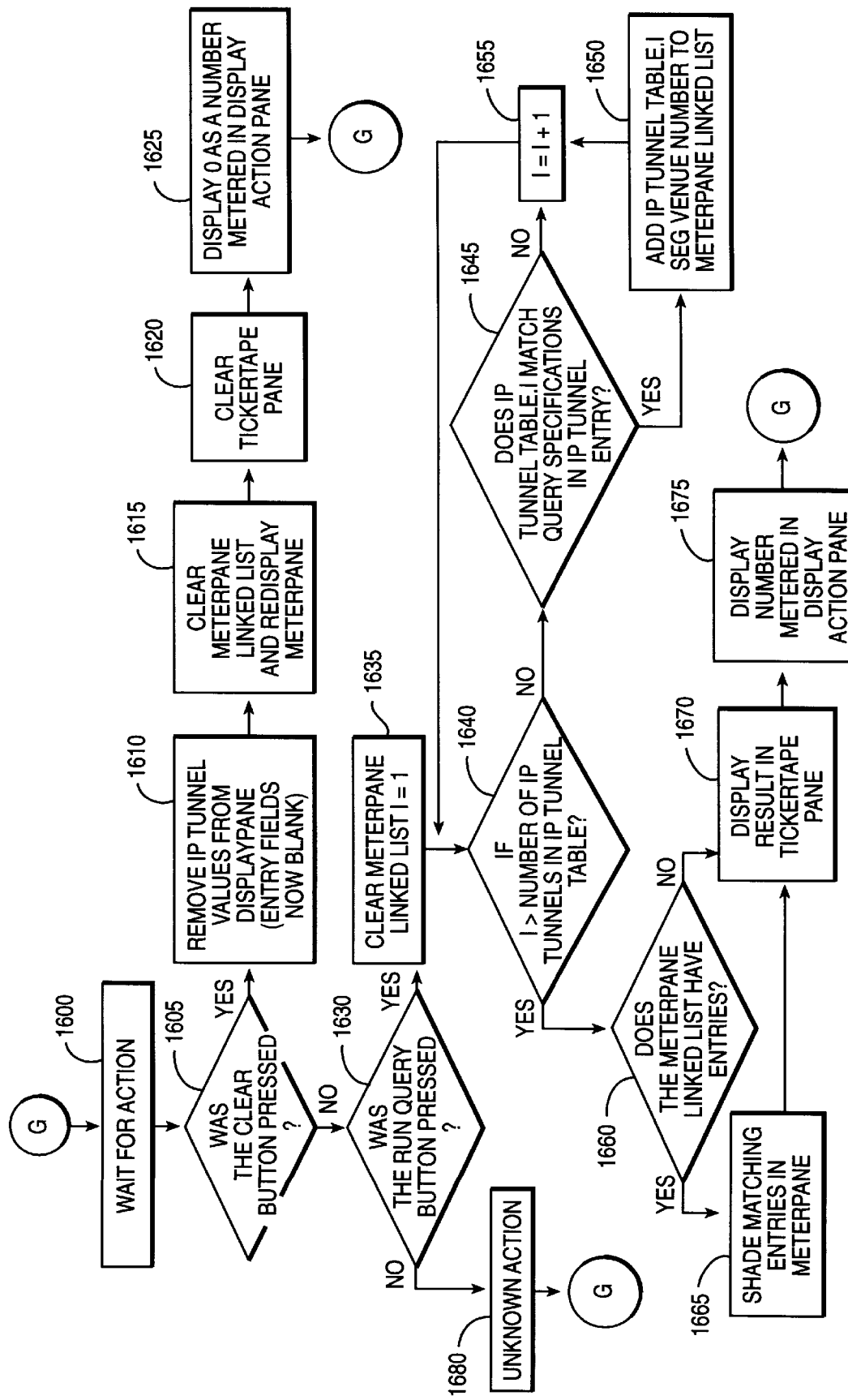
FIG. 14 shows the system processes taken according to user input in the display action pane of the IP Tunnel Query Page.

FIG. 14 is a flow diagram of system actions in response to user input in the display action pane of the IP Tunnel Query Page. The process begins in step 1600 where the system waits for user action. In step 1605, the system determines whether the clear button was pressed. In step 1610, the IP tunnel values are removed from the display pane, i.e. the entry fields are no blank. In step 1615, the meter pane's linked list is cleared and the meter pane is displayed. In step 1620, the ticker tape pane is cleared. In step 1625, zero is displayed as the number matched in the display action pane. The process returns to step 1600 to wait for user action.

In step 1630, the system determines whether the run query button was pressed. If so, in step 1635, the meter pane link list is cleared and the variable "i" which is used to increment the counter through the IP tunnel table is set to 1. In step 1640, process determines if "i" is greater than the number of IP tunnels in the IP tunnel table. If not, step 1640 determines whether the IP tunnel table matches the query specification in the IP tunnel entry. This is done by matching the inputs in the display pane against the indexed row in the list pane. In step 1650, the IP tunnel table indexed by "i" is added to the meter pane link list. In step 1655, "i" is incremented by 1 the process returns to step 1640. If "i" exceeds the number of IP tunnel in the IP tunnel table, step 1660 determines whether the meter pane link list has entries. If so, the matching entries are shaded in the meter pane, step 1665. A result is displayed in the ticker tape pane step 1670 and in step 1675 the number matched is displayed in the display action pane. The process returns to step 1600 to wait for user action. In step 1680, the action is unknown and the process returns to step 1600.

Figure 15:
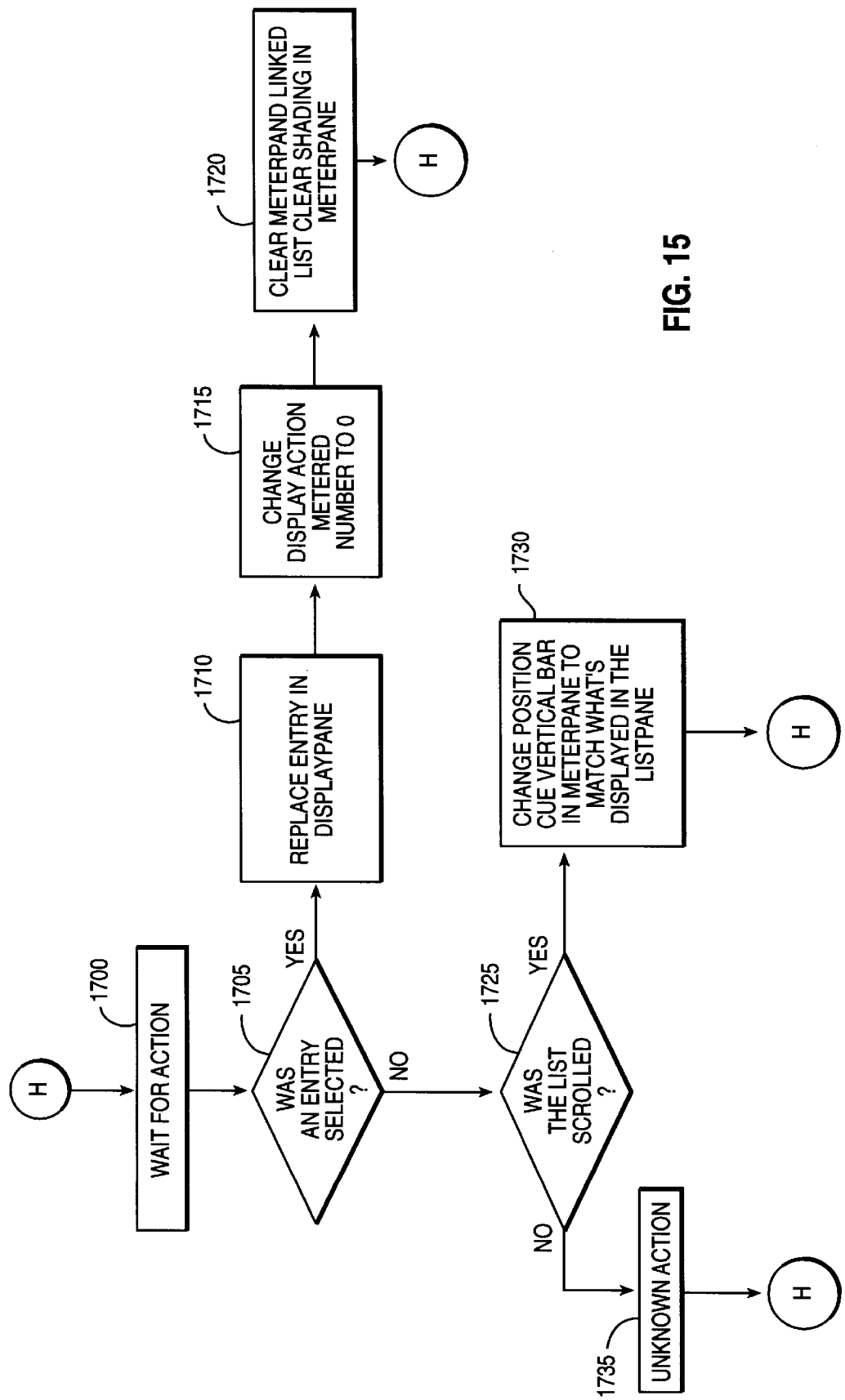
FIG. 15 shows the actions taken according to input in the list pane of the IP Tunnel Query Page.

In FIG. 15, the system actions in response to user input to the list pane in the IP Tunnel Query Page are illustrated. The system waits for user input at step 1700. In step 1705, system determines whether an entry was selected. If so, in step 1710, the entry is replaced in the display pane. The display action matched number is changed to "zero" in step 1715. Next, in step 1720, the meter pane linked list is cleared and the shading is also cleared in the meter pane. This returns to step 1700 to wait for user action.

In step 1725, the system determines whether the list scrolled in the list pane. If so, in step 1730 the position queue vertical bar in the meter pane is changed to match what is displayed in the list pane in step 1730. The process returns to step 1700. In step 1735, the system determines that the action is unknown and does nothing. Thus, returns to step 1700 to wait for user action.

Figure 16:
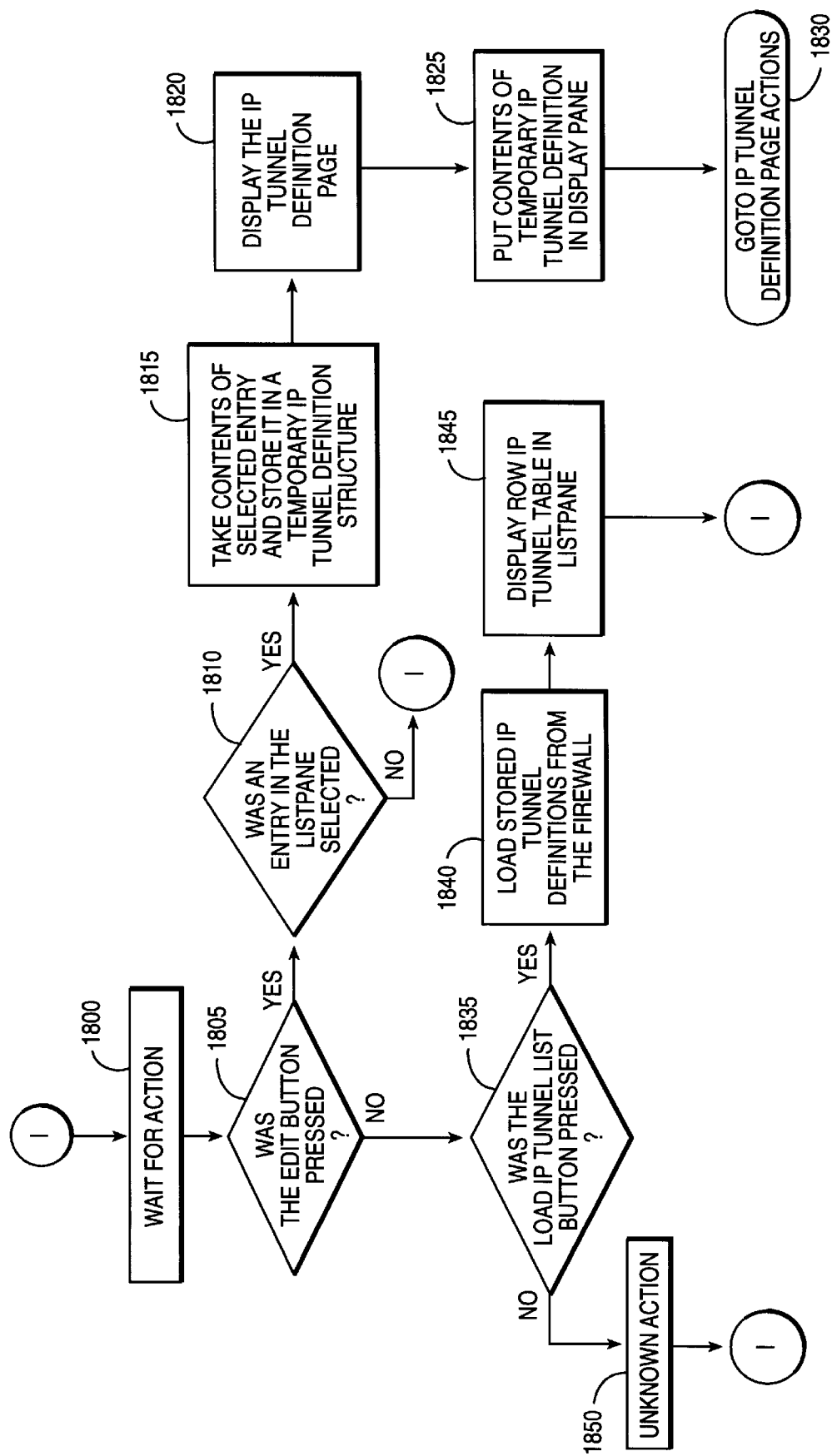
FIG. 16 is a flow diagram of the actions of the system in response to user actions in the list action pane in the IP Tunnel Query Page.

The system actions in response to user input in the list action pane of the IP Tunnel Query Page are depicted in FIG. 16. In step 1800, the system waits for user input. In step 1805, the system determines whether the edit button was pressed. If so, in step 1810, a test determines whether there was an entry in the list pane and whether it was selected. If not, the system returns to step 1800. If so, in step 1815, the contents of the selected entry are stored in a temporary IP tunnel definition structure. In step 1820, the IP Tunnel Definition Page is displayed and in step 1825 the contents of the temporary IP tunnel definition structure are placed in the display pane. Next, the system goes to the IP Tunnel Definition Page actions, step 1830, which were discussed in connection with FIGS. 10, 11A–11C, 12, 13A–13C.

In step 1835, a test determines whether the load IP tunnel button was pressed. If so, in step 1840, the load IP tunnel definitions on the firewall are stored. In step 1845, the new IP tunnel table is displayed in the List Pane. The process returns to step 1800.

In step 1850, the system determines that the action is unknown and does nothing. The process returns to step 1800 to wait for user input.

Figure 17:
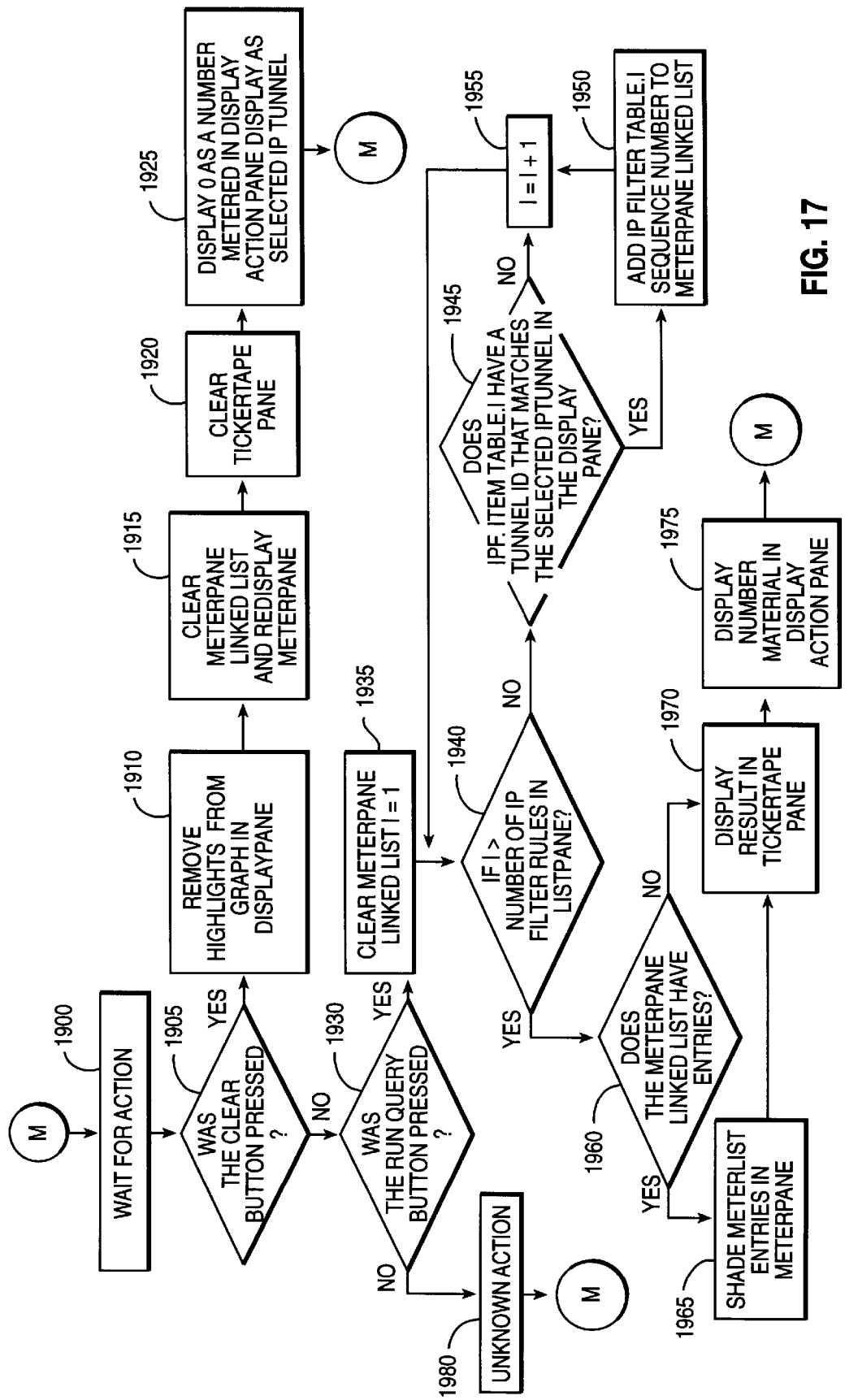
FIG. 17 shows the system actions responsive to input in the display action pane of the IP Tunnel/Filter Query Page.

The system actions taken in response to user input to the display action pane in the IP Tunnel/Filter Query Page are depicted in FIG. 17. The system waits for user input in step 1900. In step 1905, the system tests to determine whether the clear button was pressed. If so, the highlights are removed from the graph and display pane, step 1910. In step 1915, the meter pane link list is cleared and the meter pane is redisplayed. In step 1920, the ticker tape pane is cleared. In step 1925, zero is displayed as the number of filter which matched in the display action pane and the number of selected IP tunnels are displayed, the process returns to step 1900.

In step 1930, the system determines whether to run a query button was pressed. If so, in step 1935, the meter pane link list is cleared and variable "i" set to 1. In step 1940, a test determines whether "i" is greater than the number of IP filter rules in a list pane. If not, step 1945 is performed which determines whether the IP filter table has a tunnel ID which matches the selected ID tunnel in the display pane. If so, in step 1950, the Tunnel definition indexed by "i" in the IP filter table is added to the meter pane link list. Next, in step 1955, the variable "i" is incremented.

In step 1960, the system tests whether the meter pane link list has any entries. If so, in step 1965, the meter list entries matching the query definition are shaded in the meter pane. Next, in step 1970, the result is displayed in the ticker tape pane. In step 1975, the number of matching filters is displayed in the display action pane. The process returns to step 1900.

In step 1980, the system has encountered an unknown action. It returns to step 1900 to wait further user action.

Figure 18:
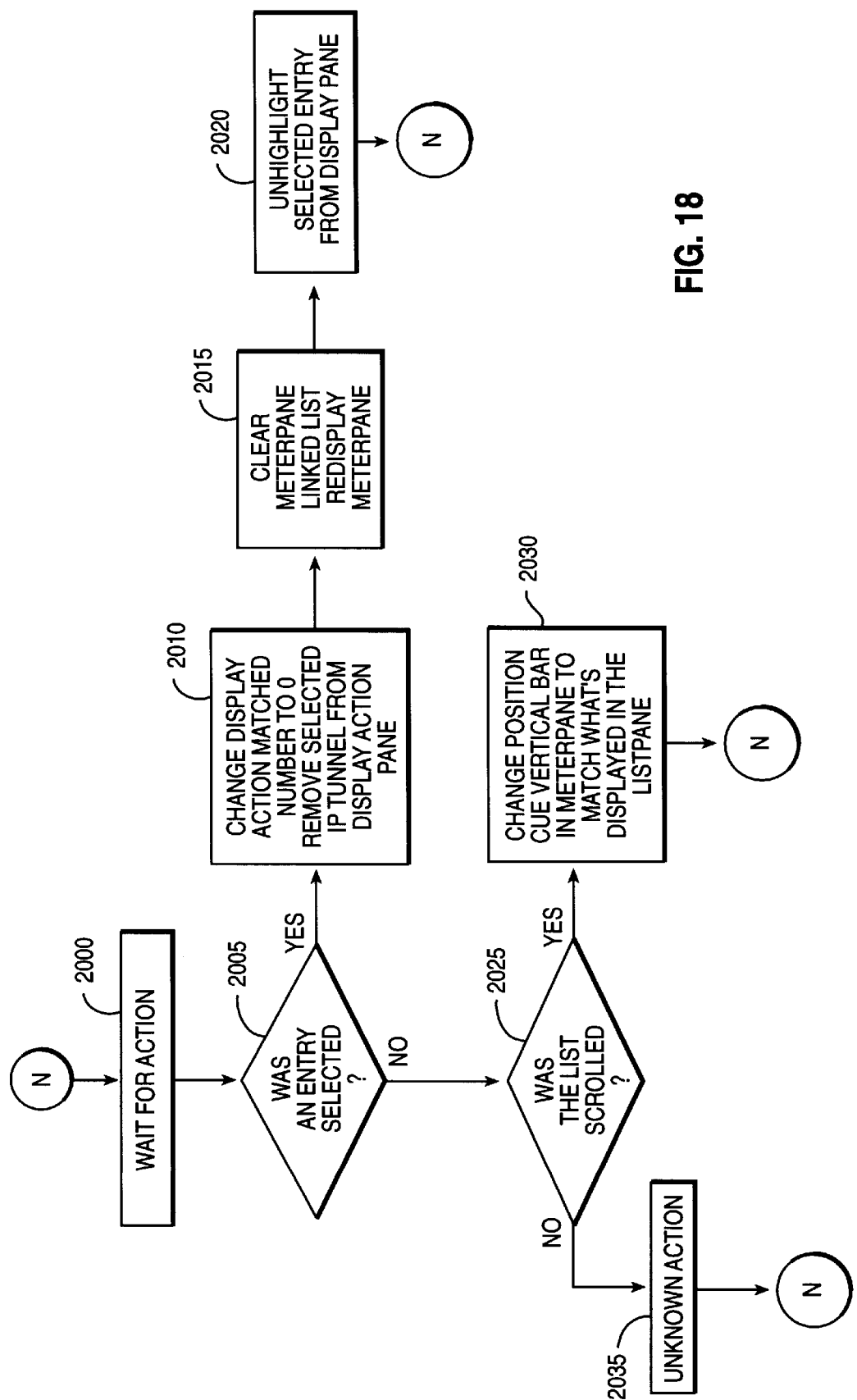
FIG. 18 shows the actions taken from the list pane of the IP Tunnel/Filter Query Page.

The system actions and response to user input to the list pane and the IP Tunnel/Filter Query Page are depicted in FIG. 18. The system waits for user input in step 2000. In step 2005, the system determines whether an entry was selected. If so, in step 2010 the display action method numbers change to "zero". The selected IP tunnel is removed from the display action pane. In step 2015, the meter pane link list is cleared and the meter pane is redisplayed. In step 2020, the highlight is removed from the selected entry in the display pane.

The test in step 2025 determines whether the list was scrolled. If so, in step 2030, the position queue on the vertical bar in the meter pane is changed to matched what is displayed in the list pane. In step 2035, the system has encountered an unknown action. The process returns to step 2000 to wait for user input.

Figure 19:
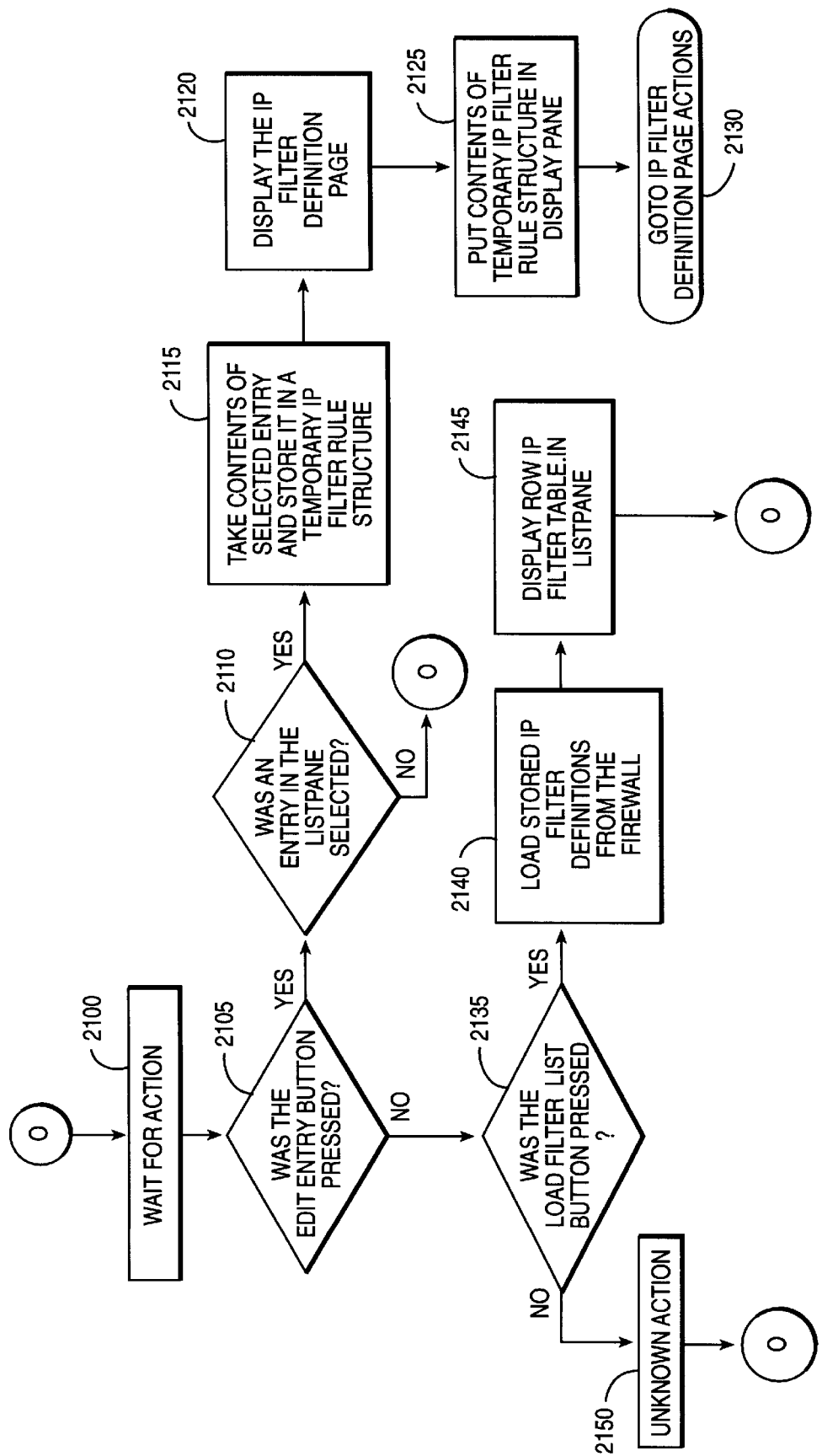
FIG. 19 is a flow diagram of the system actions in response to user actions in the list action pane in the IP Tunnel/Filter Query Page.

The actions taken to user input to the list action pane in the IP Tunnel/Filter Query Page are illustrated in FIG. 19. In step 2100, the system waits for user action. In step 2105, the test determines whether the edit entry button was pressed. If so, in step 2110, the test determines whether an entry in the list pane was selected. If not, the system waits for user action in step 2100. In step 2115, the contents of the selected entry are stored in a temporary IP filter rule structure. In step 2120, the IP Filter Definition Page is displayed. In step 2125, the contents of the temporary IP Filter rule structures displayed in the display pane at step 2130, the system goes to the IP Filter Definition Page actions which are described in the copending, crossreferenced application incorporated by reference above.

The test in step 2135 determines whether the load filter list button was pressed. If so, in step 2140 these IP/Filter Definitions from the firewall are stored. In step 2145, the new IP filter table is displayed in the list pane. The process returns to step 2100 to wait for user input. In step 2150, the system has encountered an unknown action and takes no action. The process returns to step 2100.

While the description above has been related to IP tunneling and filtering, i.e. the tunnel and filter rules promulgated by the various Internet bodies, the invention has application to any set of tunnel and filter rules which may be imposed between secure and nonsecure networks. For example, the point to point tunneling protocol originally proposed by the Microsoft Corporation could be administrated by the use of the present invention with a minimum of adaption.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

We claim:

1. A method for administering tunneling on a firewall computer between a secure computer network and a nonsecure computer network, comprising the steps of:

presenting a graphical depiction of tunnels between addresses in the networks as lines connecting icons representing network addresses, wherein the graphical depiction of tunnels can be selectively altered to show all defined tunnels, show only active tunnels or show only inactive tunnels;

responsive to user selection, from a user, of a first line, displaying a selected tunnel definition represented by the first line; and responsive to user input, from the user, performing an action on the selected tunnel definition.

2. The method as recited in claim 1 wherein the lines are drawn in different manners each indicating a property of the respective tunnel.

3. The method as recited in claim 2 wherein the property is a security status enabled for the tunnel.

4. The method as recited in claim 1 wherein the graphical depiction includes an indicia to indicate the direction from which each tunnel originated.

5. A method for administering tunneling on a firewall computer between a secure computer network and a nonsecure computer network, comprising the steps of:

presenting a user interface having a first pane in which a tunnel definition can be entered;

responsive to user input, from the user, running a query on an entered tunnel definition to determine whether any existing tunnel definitions match the entered tunnel definition;

displaying results of the query in a scatter bar in another pane in the user interface, wherein locations of matching tunnel definitions are indicated by lines through the scatter bar; and responsive to user input from the user, performing an action on a selected tunnel definition.

6. The method as recited in claim 5 further comprising the steps of:

displaying a list of tunnel definitions in a third pane wherein the matching tunnel definitions are displayed in a different manner than nonmatching tunnel definitions; and displaying a small bar proximate to the scatter bar, the small bar indicating a position of the list of tunnel definitions displayed in the third pane relative to a complete list of tunnel definitions represented by the scatter bar.

7. The method as recited in claim 5 further comprising the step of displaying a small bar proximate to the scatter bar indicating a concentration of matching tunnel definitions.

8. A method for administering tunneling on a firewall computer between a secure computer network and a nonsecure computer network, comprising the steps of:

presenting a graphical depiction of tunnels between addresses in the networks as lines connecting icons representing network addresses;

responsive to user selection, from a user, of a first line, displaying a list of filter rules applicable to a selected tunnel represented by the first line;

displaying a list of filter rules in a scatter bar, wherein location of the filter rules applicable to the selected tunnel are indicated by lines through the scatter bar; and responsive to user input, from the user, performing an action on a selected filter rule.

9. The method as recited in claim 8 wherein the display of the scatter bar is responsive to a query on the selected tunnel to determine whether any existing filter rules are applicable to the selected tunnel.

10. The method as recited in claim 9 further comprising the steps of:

displaying matching filter rules in a different manner than nonmatching filter rules in the list of filter rules; and displaying a small bar proximate to the scatter bar, the small bar indicating a position of the list of filter rules relative to a complete list of filter rules represented by the scatter bar.

11. A system including processor and memory for administering tunneling on a firewall computer between a secure computer network and a nonsecure computer network, comprising:

means for presenting a graphical depiction of tunnels between addresses in the networks as lines connecting icons representing network addresses, wherein the graphical depiction of the tunnels can be selectively altered to show defined tunnels, show only active tunnels or show only inactive tunnels;

means responsive to user selection, from a user, of a first line, for displaying a selected tunnel definition represented by the first line; and means responsive to user input, from the user, for performing an action on the selected tunnel definition.

12. The system as recited in claim 11 wherein the lines are drawn in different manners each indicating a property of the respective tunnel.

13. The system as recited in claim 12 wherein the property is a security status enabled for the tunnel.

14. The system as recited in claim 11 wherein the graphical depiction includes an indicia of the direction from which each tunnel originated.

15. A system including processor and memory for administering tunneling on a firewall computer between a secure computer network and a nonsecure computer network, comprising:

means for presenting a user interface having a first pane in which a tunnel definition can be entered;

means responsive to user input from a user for running a query on an entered tunnel definition to determine whether any existing tunnel definitions match the entered tunnel definition;

means for displaying results of the query in a scatter bar in another pane in the user interface, wherein locations of matching tunnel definitions are indicated by lines through the scatter bar; and means responsive to user input from the user for performing an action on a selected tunnel definition.

16. The system as recited in claim 15 further comprising the steps of:

means for displaying a list of tunnel definitions in a third pane wherein the matching tunnel definitions are displayed in a different manner than nonmatching tunnel definitions; and means for displaying a small bar proximate to the scatter bar, the small bar indicating a position of the list of tunnel definitions displayed in the third pane relative to a complete list of tunnel definitions represented by the scatter bar.

17. The system as recited in claim 15 further comprising means for displaying a small bar proximate to the scatter bar indicating a concentration of matching tunnel definitions.

18. A system including processor and memory for administering tunneling on a firewall computer between a secure computer network and a nonsecure computer network, comprising:

means for presenting a graphical depiction of tunnels between addresses in the networks as lines connecting icons representing network addresses;

means responsive to user selection, from a user, of a first line for displaying a list of filter rules applicable to a selected tunnel represented by the first line; and means for displaying a list of filter rules in a scatter bar, wherein location of the filter rules applicable to the selected tunnel are indicated by lines through the scatter bar;

means responsive to user input, from the user, for performing an action on a selected filter rule.

19. The system as recited in claim 18 wherein the display of the scatter bar is responsive to a query on the selected tunnel to determine whether any existing filter rules are applicable to the selected tunnel.

20. The system as recited in claim 19 further comprising:

means for displaying matching filter rules in a different manner than nonmatching filter rules in the list of filter rules; and means for displaying a small bar proximate to the scatter bar, the small bar indicating a position of the list of filter rules relative to a complete list of filter rules represented by the scatter bar.

21. A computer program product in a computer readable medium for administering tunneling on a firewall computer between a secure computer network and a nonsecure computer network, comprising:

means for presenting a graphical depiction of tunnels between addresses in the networks as lines connecting icons representing network addresses, wherein the graphical depiction of the tunnels can be selectively altered to show defined tunnels, show only active tunnels or show only inactive tunnels;

means responsive to user selection, from a user, of a first line for displaying a selected tunnel definition represented by the first line; and means responsive to user input, from the user, for performing an action on the selected tunnel definition.

22. The product as recited in claim 21 wherein the lines are drawn in different manners each indicating a property of the tunnel.

23. The product as recited in claim 22 wherein the property is a security status enabled for the tunnel.

24. The product as recited in claim 21 wherein the graphical depiction includes an indicia to indicate the direction from which each tunnel originated.

25. A computer program product in a computer readable medium for administering tunneling on a firewall computer between a secure computer network and a nonsecure computer network, comprising:

means for presenting a user interface having a first pane in which a tunnel definition can be entered;

means responsive to user input from a user for running a query on an entered tunnel definition to determine whether any existing tunnel definitions match the entered tunnel definition;

means for displaying results of the query in a scatter bar wherein locations of matching tunnel definitions are indicated by lines through the scatter bar; and means responsive to user input from the user for performing an action on a selected tunnel definition.

26. The product as recited in claim 25 further comprising:

means for displaying a list of tunnel definitions wherein the matching tunnel definitions are displayed in a different manner than nonmatching tunnel definitions; and means for displaying a small bar proximate to the scatter bar, the small bar indicating a position of the list of tunnel definitions relative to a complete list of tunnel definitions represented by the scatter bar.

27. The product as recited in claim 25 further comprising means for displaying a small bar proximate to the scatter bar indicating a concentration of matching tunnel definitions.

28. A computer program product in a computer readable medium for administering tunneling on a firewall computer between a secure computer network and a nonsecure computer network, comprising:

means for presenting a graphical depiction of tunnels between addresses in the networks as lines connecting icons representing network addresses;

means for responsive to user selection, from a user, of a first line for displaying a list of filter rules applicable to a selected tunnel represented by the first line; and means for displaying a list of filter rules in a scatter bar, wherein location of the filter rules applicable to the selected tunnel are indicated by lines through the scatter bar;

means responsive to user input, from the user for performing an action on a selected filter rule.

29. The product as recited in claim 28 wherein the display of the scatter bar is responsive to a query on the selected tunnel to determine whether any existing filter rules are applicable to the selected tunnel.

30. The product as recited in claim 29 further comprising:

means for displaying matching filter rules in a different manner than nonmatching filter rules in the list of filter rules; and means for displaying a small bar proximate to the scatter bar, the small bar indicating a position of the list of filter rules relative to a complete list of filter rules represented by the scatter bar.

* * * * *